(12) United States Patent
Danyluk et al.

(10) Patent No.: US 8,537,342 B2
(45) Date of Patent: *Sep. 17, 2013

(54) POLARISCOPE STRESS MEASUREMENT TOOL AND METHOD OF USE

(75) Inventors: Steven Danyluk, Atlanta, GA (US); Fang Li, Rocky Hill, CT (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/571,481

(22) Filed: Aug. 10, 2012

(65) Prior Publication Data

US 2012/0314202 A1 Dec. 13, 2012

Related U.S. Application Data

(63) Continuation of application No. 13/233,973, filed on Sep. 15, 2011, now Pat. No. 8,264,675.

(60) Provisional application No. 61/485,401, filed on May 12, 2011.

(51) Int. Cl.
*G01B 11/16* (2006.01)
*G01J 4/00* (2006.01)

(52) U.S. Cl.
USPC ............................................. 356/33; 356/366

(58) Field of Classification Search
USPC .................................................. 356/33, 366
See application file for complete search history.

(56) References Cited

U.S. PATENT DOCUMENTS

| | | | |
|---|---|---|---|
| 1,978,434 A * | 10/1934 | Maris | 356/30 |
| 3,177,761 A * | 4/1965 | Redner | 356/366 |
| 3,178,934 A | 4/1965 | O'Regan | |
| 3,495,910 A * | 2/1970 | Kuroha et al. | 356/491 |
| 3,589,812 A | 6/1971 | Robert | |
| H76 H * | 7/1986 | Cotterman | 356/33 |
| 4,914,487 A * | 4/1990 | Croizer et al. | 356/35 |
| 5,247,176 A * | 9/1993 | Goldstein | 250/338.1 |
| 5,521,705 A * | 5/1996 | Oldenbourg et al. | 356/368 |
| 6,665,059 B2 * | 12/2003 | Kanno et al. | 356/33 |
| 6,927,853 B2 | 8/2005 | Geiler | |
| 7,239,388 B2 * | 7/2007 | Shribak et al. | 356/364 |
| 7,289,210 B2 * | 10/2007 | Jang | 356/364 |
| 7,289,223 B2 * | 10/2007 | Mengel | 356/495 |

(Continued)

OTHER PUBLICATIONS

Umezaki, E and Pinit, P. "Digitally whole-field analysis of isoclinic parameter in photoelasticity by four-step color phase-shifting technique", Optics and Lasers in Engineering, v 45, n. 7, p. 795-807, Jul. 2007.

(Continued)

*Primary Examiner* — Roy M Punnoose
(74) *Attorney, Agent, or Firm* — Sean P. O'Hanlon, Esq. PLLC

(57) ABSTRACT

The present invention provides a tool for and method of using an infrared transmission technique to extract the full stress components of the in-plane residual stresses in thin, multi crystalline silicon wafers including in situ measurement of residual stress for large cast wafers. The shear difference method is used to obtain full stress components by integrating the shear stress map from the boundaries. System ambiguity at the boundaries is resolved completely by introducing a new analytical function. A new anisotropic stress optic law is provided, and stress optic coefficients are calibrated for different crystal grain orientations and stress orientations.

16 Claims, 36 Drawing Sheets

(56) References Cited

U.S. PATENT DOCUMENTS

| | | | |
|---|---|---|---|
| 7,372,567 B2* | 5/2008 | Shribak et al. | 356/364 |
| 7,543,254 B2 | 6/2009 | Xu | |
| 7,639,348 B2* | 12/2009 | Niitsu et al. | 356/33 |
| 7,995,205 B2* | 8/2011 | Miller et al. | 356/364 |
| 8,130,378 B2* | 3/2012 | Wu et al. | 356/364 |
| 2001/0028451 A1* | 10/2001 | Kanno et al. | 356/33 |
| 2004/0125373 A1* | 7/2004 | Oldenbourg et al. | 356/364 |
| 2007/0171419 A1* | 7/2007 | Shribak et al. | 356/364 |
| 2007/0273865 A1* | 11/2007 | Niitsu et al. | 356/33 |
| 2010/0118293 A1* | 5/2010 | Wu et al. | 356/33 |
| 2011/0205539 A1* | 8/2011 | Cattelan et al. | 356/364 |

OTHER PUBLICATIONS

Yoneyama, S. et al. "Instantaneous phase-stepping photoelasticity for the study of crack growth behavior", Proceedings of the SEM Annual Conference and Exposition on Experimental and Applied Mechanics 2007, v 2, p. 720-731, 2007.

Pinit, P. Susumu, T.; Umezaki, E. "Determination of principal-stress directions by three-step color phase shifting technique", Key Engineering Materials, v 321-323, pt.2, p. 1284-7, 2006.

Jones, F.R. et al. "Phase-stepping photoelasticity for the measurement of interfacial shear stress in single fibre composites", Composites Part A (Applied Science and Manufacturing), v 37, n. 2, p. 216-21, Feb. 2006.

Ramji, M. and Ramesh, K. "A new six-step phase shifting technique using mixed—Polariscope in Digital Photoelasticity", Key Engineering Materials, v 326-328 I, p. 35-38, 2006.

Matchett, A.J.; O'Neill, J.C.; Shaw, A.P. "Stress distributions in 2-dimensional, wedge hoppers with circular arc stress orientation—a co-ordinate-specific Lame-Maxwell model", Powder Technology, v 187, n. 3, p. 298-306, Nov. 20, 2008.

T. Liu, A. Asundi and C. Boay. "Full field automated photoelasticity suing two-load-step method", Opt. Eng. 40(8) 1629-1635, Aug. 2001.

Giovanni Petrucci & Gaetano Restivo. "Automated Stress Separation Along Stress Trajectories", Society for Experimental Mechanics 2007, pp. 733-743.

M. Ramji, K. Ramesh. "Whole field evaluation of stress components in digital photoelasticity: Issues, implementation and application", Optics and Lasers in Engineering 46, 257-271 2008.

Ramji, M. et al. "Assessment of autonomous phase unwrapping of isochromatic phase maps in digital photoelasticity", Sadhana—Academy Proceedings in Engineering Sciences, v 33, n. 1, p. 27-44, Feb. 2008.

Baldi, Antonio et al. "A temporal phase unwrapping algorithm for photoelastic stress analysis", Optics and Lasers in Engineering, v 45, n. 5, p. 612-617, May 2007, Optical Methods in Experimental Mechanics.

Siegmann, P. et al. "A robust approach to demodulating and unwrapping phase-stepped photoelastic data", Experimental Mechanics, v 45, n. 3, p. 278-289, Jun. 2005.

E. A. Patterson, W. Ji, and Z. F. Wang. "On image analysis for birefringence measurements in photoelasticity", Optics and Lasers in Engineering, 28(1):17-36, 1997.

W. Ji and E. A. Patterson. "Simulation of errors in automated photoelasticity. Experimental Mechanics", 38(2):132-139, 1998.

F. Li. "Study of Stress Measurement Using Polariscope", PhD thesis, 2010.

R. B. Thompson, et al. "Non-destructive evaluation, application to materials processing—Effects of microstructure on the acoustoelastic measurements of stress", American Society for Metals, 137-145, 1984.

S. He and S. Danyluk. "Residual Stress Characterization for Solar Cells by Infrared Polariscopy", National Center for Photovoltaics and Solar Program Review Meeting, Denver Colorado, 2003.

Horie, H. et al. "Photoviscoelastic stress and strain analysis of a circular disk under nonproportional orthogonal compression", Nippon Kikai Gakkai Ronbunshu, A Hen/Transactions of the Japan Society of Mechanical Engineers, Part A, v 61, n. 591, p. 2489-2494, Nov. 1995.

Fernandez, M. et al. "Stress-separation techniques in photoelasticity: a review", The Journal of Strain Analysis for Engineering Design, vol. 45, Jan. 2010.

Higashino, Toshiyuki et al. "Temperature gradient and heat balance at the solid-liquid interface in CZ silicon growth", Journal of the Vacuum Society of Japan, v 43, n. 5, p. 603-606, 2000.

L. C. Garone, C. V. Hari Rao, A. D. Morrison, T. Surek, and K. V. Ravi. "Orientation dependence of defect structure in EFG silicon ribbons", Applied Physics Letters, 29(8) 492:511, 1976.

Sheoran, Manav et al. "Bulk lifetime and efficiency enhancement due to gettering and hydrogenation of defects during cast multicrystalline silicon solar cell fabrication", Solid-State Electronics, v 52, n. 5, p. 612-617, May 2008.

Shimokawa, Ryuichi et al. "Solar cell characteristics of high-efficiency polycrystalline silicon solar cells using SOG-cast wafers", Japanese Journal of Applied Physics, Part 1: Regular Papers & Short Notes, v 26, n. 10, p. 1667-1673, Oct. 1987.

Bei Wu et al. "Bulk multicrystalline silicon growth for photovoltaic (PV) application", Journal of Crystal Growth 310 (2008) 2178-2184.

Hewitt, Geoff F. and Pugh, Simon J. "Approximate design and costing methods for heat exchangers", Heat Transfer Engineering, v 28, n. 2, p. 76-86, Feb. 2007.

C.K. Bhihe et. al. "Residual stresses in crystal growth", Journal of Crystal Growth. vol. 137. p. 86-90. 1994.B. Chalmers.

J.C. Lambropoulos, et. al. "Plastic deformation influence on stress generated during silicon sheet growth at high speeds", Journal of Crystal Growth. vol. 65. p. 324-330. 1983.

T. Zheng. "A study of residual stresses in thin anisotropic (silicon) plates", PhD thesis, 2000.

J.P. Kalejs. "Modeling contributions in commercialization of silicon ribbon growth from the melt", Journal of Crystal Growth, 230 (1-2) p. 10-21, 2001.

J. F. Flavenot. "Handbook of measurement of residual stresses", Society for Experimental Mechanics, 35-48, 1996.

Todd, R.I. et al. "Thermal residual stresses and their toughening effect in Al2O3 platelet reinforced glass", Acta Materialia, v 47, n. 11, p. 3233-40, Sep. 8, 1999.

Peitl, O. and Zanotto. E.D. "Thermal shock properties of chemically toughened borosilicate glass", Source: Journal of Non-Crystalline Solids, v 247, p. 39-49, May 1999.

Neto, P., Alfaiate, J. and Vinagre, J. "Numerical modelling of concrete beams reinforced with pre-stressed CFRP", International Journal of Fracture, v 157, n. 1-2, p. 159-173, 2009.

Iskhakov, I. and Ribakov. "Two-layer pre-stressed beams consisting of normal and steel fibered high strength concrete", Y. Source: Materials and Design, v 29, n. 8, p. 1616-22, 2008.

R. G. Seidensticker and R. H. Hopkins. "Silicon ribbon growth by the dendritic web process", Journal of Crystal Growth, 50(1)221-235, 1980.

V. Garcia. "Effect of Dislocation Density on Residual Stress in Edge-Defined Film-Fed Growth Silicon Wafers", Master Thesis.

He, S. Danyluk, S.; Tarasov, I.; Ostapenko, S. "Residual stresses in polycrystalline silicon sheet and their relation to electron-hole lifetime", Applied Physics Letters, v 89, n. 11, p. 111909-1-3, Sep. 11, 2006.

K. Ramesh and S.K. Mangal. "Data acquisition techniques in digital photoelasticity: a review", Optics and lasers in engineering, 30:53-75, 1998.

E. A. Patterson. "Digital photoelasticity: principles, practices and potential", Strain, 38:27-39, 2002.

P. Doig and P.E.J. Flewitt. "Non-destructive stress measurement using x-ray diffraction methods", NDT International, 11(3)127-131, 1978.

S. Shin and H. Yano. "Evaluation of error of x-ray residual stress measurement method. In Japan Soc. Instrum. & Control Eng, Tokyo, editor, Recent Advances in Weighing Technology and Force Measurement", 10th International Conference of the IMEKO Technical Committee TC-3 on Measurement of Force and Mass, Kobe, Japan, 1984.

A. S. M. Y. Munsi, A. J. Waddell, and C. A. Walker. "A method for determining x-ray elastic constants for the measurement of residual stress", Strain, 39(1):3-10, 2003.

Baczmanski, A.; Braham, C.; Seiler, W.; Shiraki, N. "Multi-reflection method and grazing incidence geometry used for stress measurement by X-ray diffraction", Source: Surface & Coatings Technology, v 182, n. 1, p. 43-54, Apr. 1, 2004.

K. Y. Kim and W. Sachse. "The theory of thermodynamic-acoustoelastic stress gauge", Journal of Applied Physics, 80 (9):4934-4943, 1996.

H. R. Dorfi, H. H R. Busby, and M. Janssen. "Acoustoelasticity: Ultrasonic stress field reconstruction", Experimental Mechanics, 36(4):325-332, 1996.

R. B. thompson, W. Y. Iu, and A. A. clark. "Handbook of measurement of residual stresses", Society for Experimental Mechanics, 149-178, 1996.

Jing-Fung Lin et al. "Measurements of the principal axis and phase retardation using a new circular polariscope and the Senarmont setup", Proceedings of the SPIE—The International Society for Optical Engineering, v 5852, n. 1, p. 240-4, 2005.

A. T. Andonian and S. Danyluk. "Non-destructive determination of residual-stresses in circular silicon-wafers", Mechanics Research Communications,11(2):97-104, 1984.

A. T. Andonian and S. Danyluk. "Residual-stresses of thin, short rectangular-plates", Journal of Materials Science, 20 (12):4459-4464, 1985.

K. Ghaffari, B. Wang, S. Danyluk, M. Billone, and G. Pharr. "Optical interferometric determination of in-plane residual stresses in SiO2 films on silicon substrates", Materials Evaluation, 54(10):1167-1170, 1996.

Y. Kwon, S. Danyluk, L. Bucciarelli, and J. P. Kalejs. "Residual-stress measurement in silicon sheet by shadow moire interferometry", Journal of Crystal Growth, 82(1-2):221-227, 1987.

H. W. Park and S. Danyluk. "Residual-stress measurement in filament—evaporated aluminum films on single-crystal silicon-wafers", Journal of Materials Science, 26(1):23-27 1991.

Paradowska, A.M. et al. "Residual stress distribution in steel butt welds measured using neutron and synchrotron diffraction", Journal of Physics Condensed Matter, v 21, n. 12, 2009.

Mad, D. et al. "Measurement of residual thermal stress in WC-Co by neutron diffraction", International Journal of Refractory Metals & Hard Materials, v 27, n. 2, p. 282-7, Mar. 2009.

Tieyu Zheng and Steven Danyluk. "Study of stresses in thin silicon wafers with near-infrared phase stepping photoelasticity", Journal of materials research, vol. 17 No. 1, Jan. 2002.

S. He. "Near Infrared Photoelasticity of Polycrystalline Silicon and it's Relation to In-plane Residual Stresses", PhD thesis, 2005.

Cloud, Gary. "Optical methods in experimental mechanics: Part 34: Photoelasticity VI—The circular polariscope", Experimental Techniques, v 32, n. 6, p. 21-23, 2008.

T. Zheng and S. Danyluk. "Nondestructive measurement of in plane residual stress in thin silicon substrates by infrared transmission", Matl. Evaluation, vol. 50, No. 10, Oct. 2001, pp. 1227-1233.

S. He, T. Zheng and S. Danyluk. "Analysis and determination of stress-optic coefficient of thin single crystal silicon samples" Journal of applied physics, vol. 96, No. 6, Dec. 15, 2004, pp. 3103-3109.

David Brewster. "On the communication of the structure of doubly refracting crystals to glass, muriate of soda, flour spar and other substances by mechanical compression and dilatation", Philosophical Transactions of the Royal Society, pp. 156-178, 1816.

D. Brewster. "Experiments on the depolarization of light as exhibited by various mineral, animal and vegetable bodies with a reference of the phenomena to the general principle of polarisation", Phil. Tras. 1815, pp. 29-53.

Seong-Min Jeong and Kitamura, T. "Structural transformation of single crystal silicon under uniaxial stress", Key Engineering Materials, v 345-346, pt2, p. 963-966, 2007.

Meyer, C. et al. "Nonlinear optical mapping of silicon carbide polytypes in 6H-SiC epilayers", Applied Physics Letters, v 69, n. 15, pp. 1374-1377, Oct. 7, 1996.

F. W. Hecker and B. Morche. "Computer-aided measurement of relative retardations in plane photoelalsticity", Experimental Stress Analysis, pp. 535-542, 1986.

* cited by examiner

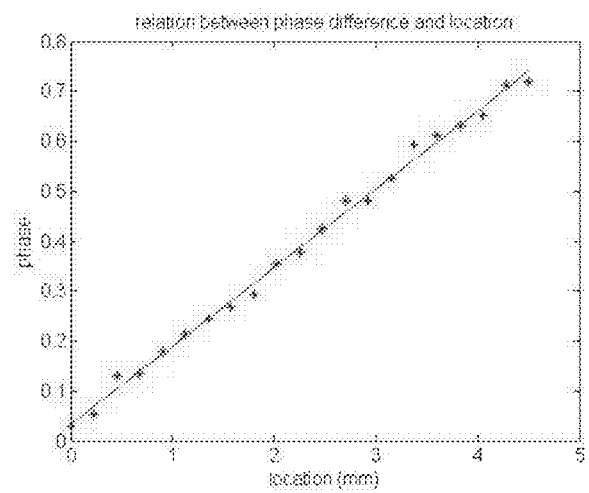
FIG. 26
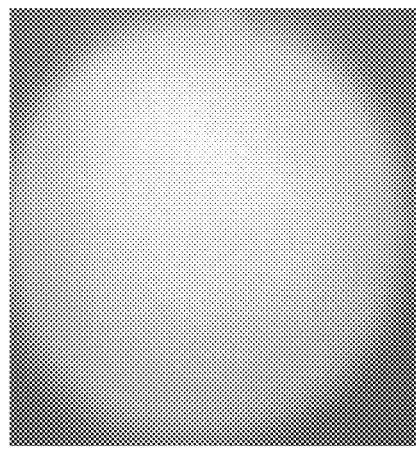 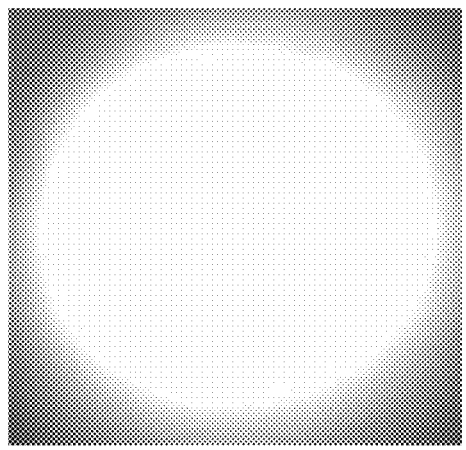
FIG. 27  FIG. 28

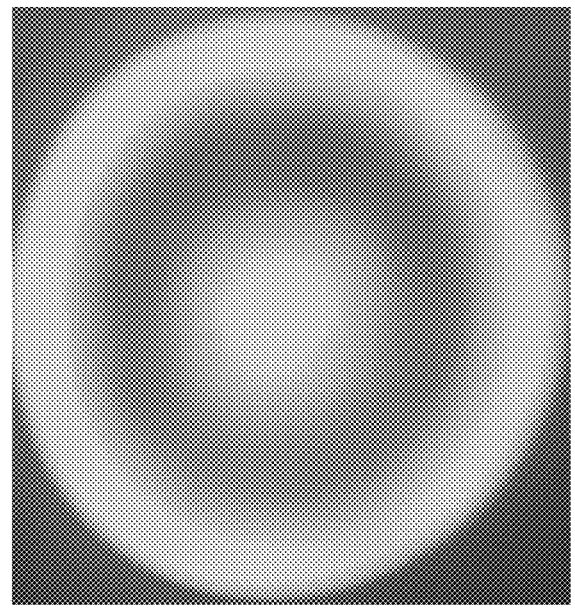
FIG. 72
 
FIG. 73       FIG. 74

 
FIG. 79　　　　　　　　FIG. 80
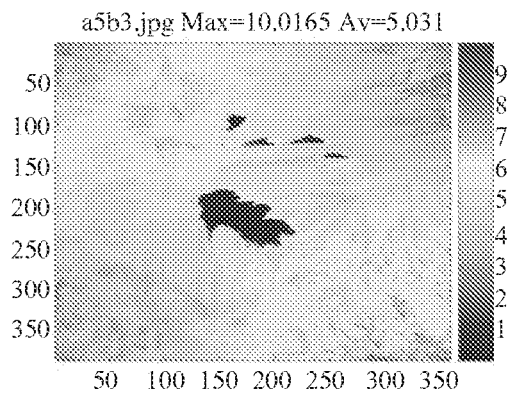 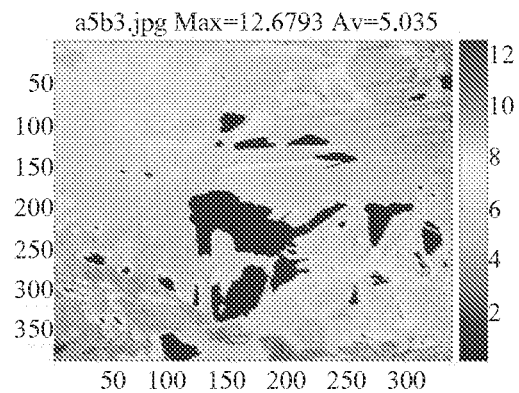
FIG. 81　　　　　　　　FIG. 82
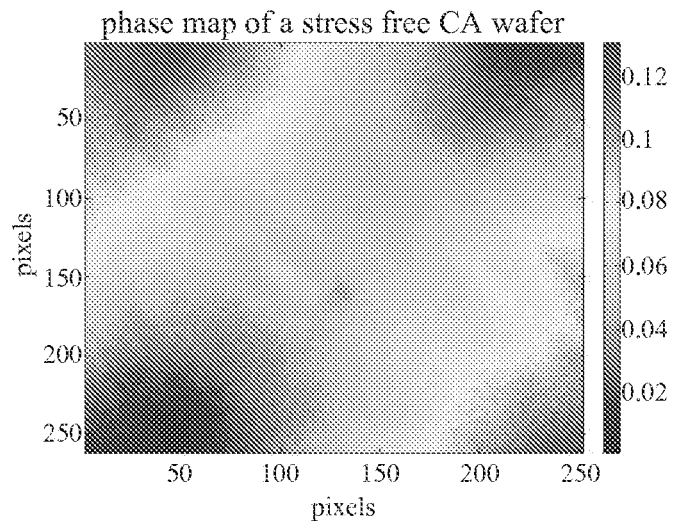
FIG. 83

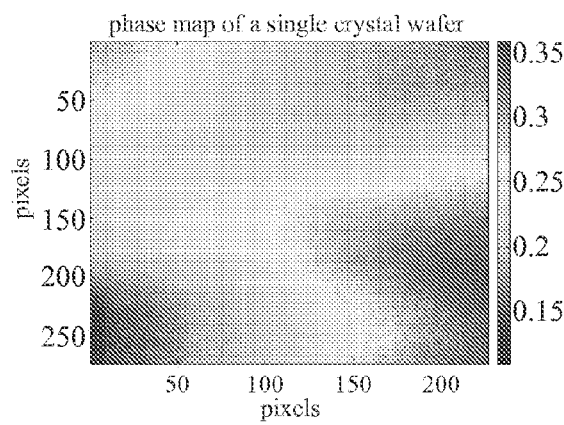
FIG. 84
FIG. 85
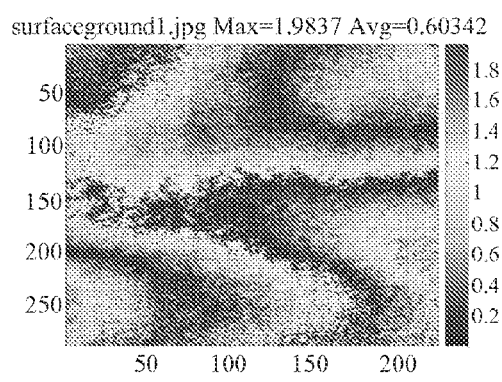
FIG. 86
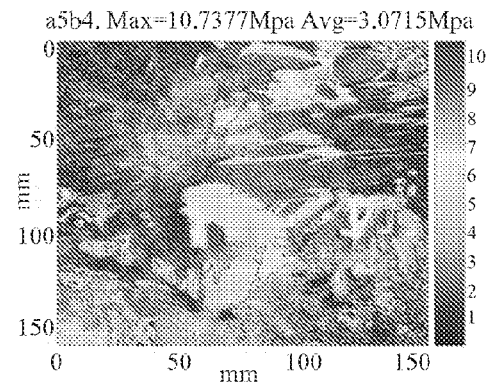
FIG. 87

POLARISCOPE STRESS MEASUREMENT TOOL AND METHOD OF USE

CROSS-REFERENCE TO RELATED APPLICATIONS

This patent application is a continuation of U.S. patent application Ser. No. 13/233,973 filed on Sep. 15, 2011, now U.S. Pat. No. 8,264,675, which claims the benefit of U.S. Provisional Patent Application No. 61/485,401 filed on May 12, 2011. Both of these patent application documents are incorporated herein by reference in their entireties.

BACKGROUND OF THE INVENTION

1. Field of the Invention

The present invention relates to a tool for and method of measuring, and, more particularly, the present invention relates to in situ, non-destructive determination of the full stress components for thin, flat crystalline solids using poliariscopy.

2. Description of the Related Art

The photovoltaic (PV) industry uses single crystal and polycrystalline silicon in the manufacturing of PV modules. Single crystal wafers are usually grown from a liquid melt into ingots by the Czochralski (CZ) method as shown in FIG. 1. The Czochralski method is used for high volume production of single crystal silicon. A crystal is "pulled" out of a vessel containing liquid silicon by dipping a seed crystal into the liquid which is subsequently slowly withdrawn at a surface temperature of the melt just above the melting point. The diameter of the ingot is determined by the pulling rate and the temperature profile.

Multi crystalline silicon is produced by a number of different methods, including the edge-defined film growth (EFG) method and casting. Wafers produced by the EFG method use a die to define the thickness of the produced silicon wafer as shown in FIG. 2. By adjustment of the temperature profile of the graphite die, the silicon sheet crystallizes with large grains. Usually the shape of the ingot produced by the EFG method is large polygons. Recently the technique has been used to produce large cylinders of material as shown in FIG. 3. The large cylindrical material needs to be flattened out for further processing.

Casting is also used to produce multi crystalline silicon. In the photovoltaic industry, about 60% of solar cells are made from cast wafers with a typical efficiency of 13-16.5%. Multi crystalline silicon is usually cast in a fused silica crucible supported by graphite as shown in FIG. 4. Typically, crystallization starts at the bottom of the crucible where the temperature is lowered below the melting temperature (1450° C.) of silicon.

After casting, silicon wafers are produced by sawing. Microelectronic circuits or photovoltaic devices are fabricated on these substrates through various chemical, physical, and thermal processes.

During the growth of EFG silicon, the temperature of the silicon melt is typically in the range of 1450° C., and it drops to room temperature within 0.5 m from the solid-melt interface. Therefore, a high thermal gradient is unavoidable at the solid-melt interface. A similar situation occurs during the crystallization of cast wafers as shown in FIG. 4. Thermal gradients cannot be removed completely, although techniques such as heat exchange method (HEM) systems can reduce the thermal gradient. The magnitude of the thermal stresses is approximately proportional to the curvature of the temperature profile. For this reason, modeling of residual stress usually involves knowledge of the temperature profile, as seen in the work of Bhihe et al. and Lambropoulos et al. The ensuing thermal processing in cell manufacturing, such as oxidation and diffusion, may also introduce non-uniform heating and cooling that results in a substantial thermal gradient and may introduce additional residual stresses. A combination of thermal and mechanical stresses caused during production is frozen into the wafers in the form of strain, which can be reduced but not completely removed by post growth annealing.

Residual stresses may enhance the performance of a mechanical structure and the effects of residual stresses on fatigue are covered in detail elsewhere. Residual stresses can raise or lower the mean stress experienced over a fatigue cycle and an example of how this influences metal structures can be seen in the improvement of the fatigue life. The static loading performance of brittle materials can be improved markedly by the use of residual stresses. Common examples include thermally toughened glass and pre-stressed concrete. For plastically deformable materials, the residual and applied stresses can only be added together directly until the yield strength is reached. In this respect, residual stresses may accelerate or delay the onset of plastic deformation.

In many cases, unexpected failure occurs due to the presence of residual stresses that have combined with the service stresses to shorten component life. Furthermore, in natural or artificial multiphase materials, residual stresses can result in differences in thermal expansion, yield stress, and stiffness. Residual stresses in silicon may cause mechanical failure during processing and change the optical or electrical properties of the wafer. Tensile residual stresses in silicon will lead to crack growth and reduced electron-hole lifetime and wafer breakage. High tensile stresses will also cause unexpected failure during processing of cells when service stresses are introduced. Furthermore, the regions close to the wafer edges may contain micro-cracks which will eventually propagate and fracture the cell in handling during subsequent device fabrication since cracks will propagate in the region of tensile residual stresses.

As strain due to thermal gradient is introduced during growth, the crystal will relieve the residual stresses by the generation and propagation of dislocations. The relationship between residual stresses and dislocation density in silicon wafers was studied by V. Garcia and an inverse correlation was found between residual stresses and dislocation etch pits. It is believed that this will eventually impact the lifetime and thus the efficiency of photovoltaic cells. As the sheet becomes thinner, the grown-in residual stresses, coupled with the stresses imposed during manufacturing, present a formidable challenge. There has been a significant effort to develop non-destructive techniques that expose the in-plane residual stresses, but that prior work is neither fast enough nor sensitive enough to implement in the manufacturing of solar cells.

All stress measurement techniques can be divided into one of two classes: one measures actual strain, and the other measures changes in strain. Residual stress measurement techniques may also be classified by whether the technique is destructive or non-destructive. The choice of a measurement technique should be based on the kind of information needed so it is important to recognize the limitations of each technique. Non-destructive methods are needed for in situ quality monitoring for photovoltaic processing. The most commonly used non-destructive methods are x-ray diffraction, ultrasonic microscopy, shadow Moiré, neutron diffraction, and photo elasticity.

X-ray diffraction detects the strain-induced changes in the crystal lattice, which can then be used to obtain the residual stresses. The sensitivity of this technique is reported to be around 10 MPa. X-ray diffraction measures strains within the surface depending on the x-ray source. Penetration of the specimen by the x-ray beam is related to a number of factors, including material density and beam energy. Generally speaking, the information in the diffracted beam comes from a volume that is about 8 to 20 μm below the surface, and the volume is always slightly larger than the beam size due to scattering.

Ultrasonic microscopy refers to the measurement of residual stresses by the propagation of acoustic waves in a medium under different stresses. Changes in ultrasonic speed can be observed when a material is subjected to stress, the changes providing a measure of the stress averaged along the wave path. The acoustoelastic coefficients necessary for the analysis are usually calculated using calibration tests. A main difficulty of this technique is that the relative change in wave speed is very small, typically of the order of $10^{-1}$ MPa$^{-1}$. The method provides a measure of the macro-stresses over large volumes of material. Ultrasonic wave velocities can depend on micro-structural inhomogeneities, and there are difficulties in separating the effects of multi-axial stresses. Therefore, acoustoelastic microscopy is especially useful in materials uniform both in microstructure and composition, such as single crystal silicon.

Shadow Moiré can detect the residual stresses in circular or rectangular plates. The technique depends on deforming a sample and then comparing the deformation to an analysis and deflection. S. Danyluk and his research group have developed the analytical theory for beam, rectangular and circular plates and used this analysis to extract residual stresses from the displacement measured by shadow Moiré. The limitation of this method is that a certain profile needs to be assumed for the residual stresses. For example, an axis-symmetrical profile is assumed for circular plate. Since the residual stresses are forced to comply with the assumed profile, this technique is not sensitive to the local stress concentrations.

Neutrons have an advantage over x-rays since the wavelengths are comparable to the atomic spacing and their penetration into engineering materials is typically many centimeters. The technique allows for collection of a full stress tensor, or simple tri-axial stresses, depending on how many vectors are measured. Beam penetration is about 152 mm in aluminum, 38 mm in iron and steel, and varies significantly in materials such as titanium and zirconium. Unfortunately, since this technique requires a nuclear reactor to supply the neutrons, its use is limited by access to these facilities, and the technique can be prohibitively expensive.

Photoelasticity is an experimental method to determine the stress distribution in a material where mathematical methods become quite cumbersome. Unlike the analytical methods of stress determination, photoelasticity gives a fairly accurate picture of stress distribution even around abrupt discontinuities in a material. The method serves as an important tool for determining the critical stress points in a material and is often used for determining the stress concentration factors in irregular geometries.

The method is based on the property of birefringence, which is exhibited by certain transparent materials. Birefringence is a property where a ray of light passing through a material experiences two refractive indices. The property of birefringence or double refraction is exhibited by many optical crystals, but photoelastic materials exhibit the property of birefringence only on the application of stress and the magnitude of the refractive indices at each point in the material is directly related to the state of stress at that point. When a ray of light passes through a photoelastic material, it becomes polarized and gets resolved along the two principal stress directions and each of these components experiences different refractive indices. The difference in the refractive indices leads to a relative phase difference between the two component waves, which is usually called phase retardation as shown in FIG. 5, where H indicates horizontally polarized, V indicates vertically polarized, and δ indicates phase retardation. The magnitude of the relative retardation is given by the stress optic law.

Photoelasticity can be applied to three and two dimensional states of stress. However, the application of photoelasticity to the two dimensional plane stress system is much easier to analyze, especially when the thickness of the sample is much smaller as compared to dimensions in the plane. In this case, stresses act only in the plane of the solid, as the other stress components are zero. The experimental setup to evaluate photoelastic behavior varies from experiment to experiment, but the two basic kinds of setup used are the plane polariscope and circular polariscope.

A commonly used technique to obtain the photoelasticity parameters using a polariscope is phase stepping. The phase stepping concept for photoelasticity was first introduced by F. Hecker and B. Morche, who used plane and circular polariscopes to extract the isochromatic and isoclinic angles, respectively. The stepping technique records multiple images comprising individual picture elements or pixels. The number of images recorded is normally three to ten images or steps, corresponding to different alignments of optical components in the polariscope and uses the image intensities to solve for the photoelastic parameters for each pixel. Calibration methods using applied known stresses (four point bending) and full-field illumination have been used to calibrate the stress optic coefficients, increase system resolution, and produce full field stress.

SUMMARY OF THE INVENTION

The present invention provides an infrared transmission technique to extract the full stress components of the in-plane residual stresses in thin, multi crystalline silicon wafers including in situ measurement of residual stress for large cast wafers. Previous research has built a circular polariscope system to measure the maximum shear stress in silicon wafers. The resolution of such systems typically is about 1.2 MPa. This invention provides a new polariscope system that is capable of full-field measurement of wafers as large as 156 mm×156 mm, and is fundamentally capable of measuring much larger wafers being limited only by the optical design of the polariscope. A new anisotropic stress optic law is provided, and stress optic coefficients are calibrated for different crystal grain orientations and stress orientations in the silicon wafer. The relative magnitude of the maximum stress optic coefficients is observed to be approximately 1.7 times the observed minimum.

System ambiguity at the boundaries is resolved completely by introducing a new function. The shear difference method is used to obtain full stress components by integrating the shear stress map from the boundaries. The integration error is observed to be approximately 1 MPa within 10 mm from the starting point of the integration. This was verified by calibration using a CZ single crystal wafer beam loaded in four point bending.

DESCRIPTION OF THE DRAWINGS

The present invention is described with reference to the accompanying drawings, wherein:

FIG. 26 illustrates the least square fit for the retardation of grain 14 of FIG. 23;

FIG. 27 illustrates a transmission image of a (100) single crystal silicon wafer;

FIG. 28 illustrates a transmission image of a (111) single crystal silicon wafer;

FIG. 72 illustrates an airy disk of the aligned polariscope of FIG. 35;

FIG. 73 illustrates the first image of a six phase stepping method for the polariscope of FIG. 35;

FIG. 74 illustrates the second image of a six phase stepping method for the polariscope of FIG. 35;

FIG. 79 illustrates an image taken by the camera of the polariscope of FIG. 35 before adjusting the camera response;

FIG. 80 illustrates an image taken by the camera of the polariscope of FIG. 35 after adjusting the camera response;

FIG. 81 illustrates the maximum shear stresses taken by the camera of the polariscope of FIG. 35 before adjusting the camera response;

FIG. 82 illustrates the maximum shear stresses taken by the camera of the polariscope of FIG. 35 after adjusting the camera response;

FIG. 83 illustrates a phase map of a stress-free silicon wafer measured by the polariscope of FIG. 35;

FIG. 84 illustrates a phase map of a CZ silicon single crystal;

FIG. 85 illustrates a phase map a CZ silicon cast wafer;

FIG. 86 illustrates a stress map of the CZ silicon single crystal of FIG. 84 after eliminating system error; and FIG. 87 illustrates a stress may of the CZ silicon cast wafer of FIG. 85 after eliminating system error.

Figure 1:
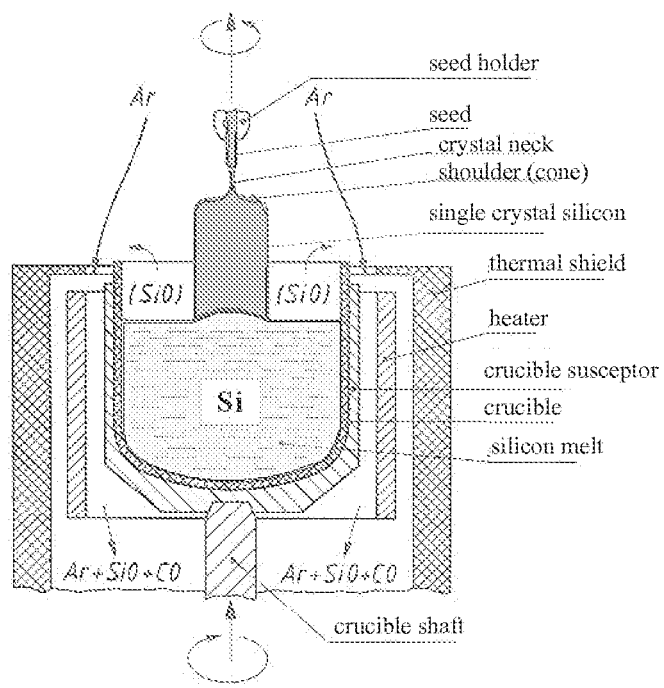
FIG. 1 illustrates the Czochralski method of producing single crystal wafer growth.
Figure 2:
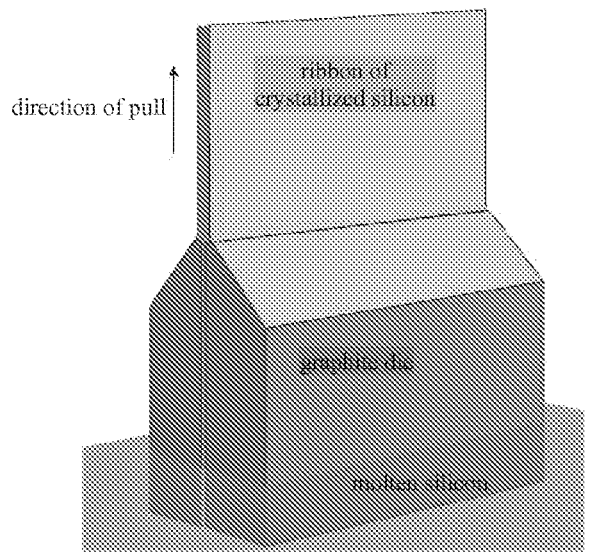
FIG. 2 illustrates wafers produced by the edge-defined film growth.
Figure 3:
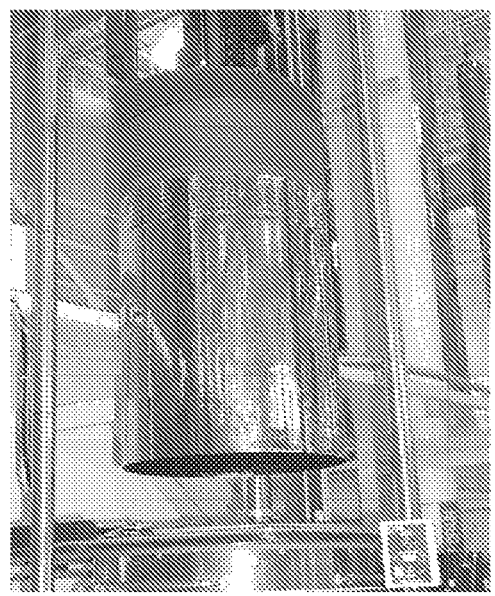
FIG. 3 illustrates large thin-walled cylinders grown by edge-defined film growth process.
Figure 4:
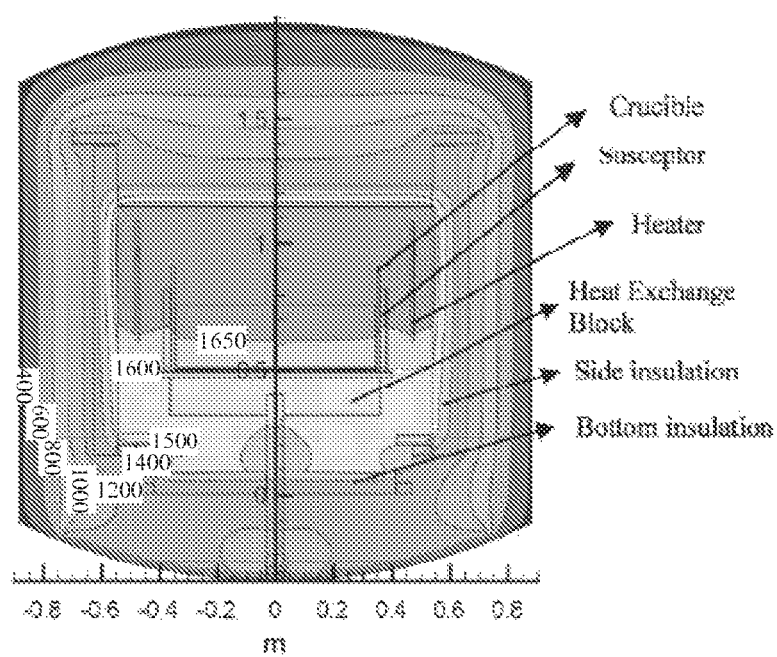
FIG. 4 illustrates the casting of multi crystalline silicon in a fused silica crucible.

While the drawings presented herein are in black and white to comply with pertinent rules and regulations, it is more preferable to use color images to more clearly present the image information.

DETAILED DESCRIPTION OF THE INVENTION

This instant invention is directed to a tool for and method of measuring stress using a polariscope for thin, flat crystalline solids. Multi-crystal silicon will be discussed herein as a model material. The anisotropic stress optic coefficients are characterized for different crystal and stress orientations. The inventive polariscope system allows for the measurement of large samples. The full stress components are extracted from the measurement of the polariscope by the shear difference method. Finally, the thermally induced stress was modeled using ANSYS and compared to measured stresses.

In the last number of years, efforts have been made to develop techniques to obtain the in-plane residual stress in silicon, especially in poly-crystalline silicon, in order to improve the efficiency and reliability of photovoltaic cells. Wafers used in the photovoltaic industry are becoming larger and thinner. The residual stresses are generally higher in thin materials, and it takes more effort to measure bigger samples. Fundamental work on the development of a non-destructive and non-contact residual stress measurement technique for solar silicon wafers has been carried out by S. Danyluk and his research group. This work has resulted in an infrared (IR) polariscope based method for such measurements. The system developed to date has been shown to be capable of measuring the in-plane maximum shear residual stress distribution in silicon wafers of thickness ranging from 100 μm to 2 mm and sizes of up to 156 mm×156 mm, although the technique is fundamentally capable of measuring wafers much thinner as well as wafers that are much larger in area (the technique being limited only by the design and construction of the polariscope). This technique measures the stress-induced birefringence, which is proportional to the magnitude of the residual stresses, by evaluating the change in the polarization state of the transmitted light using a stepping method that measures transmitted light intensity at a number of different optical arrangements. The residual stresses are determined from an expanded anisotropic stress optic law. This technique senses strain in the silicon wafer directly as opposed to Shadow Moiré, whose accuracy is often deteriorated by the differentiation of the measured displacement. Furthermore, the present invention makes use of the phase-stepping technique, which provides a fast and automatic way to extract the principal shear stress and its orientation. System ambiguities are resolved by introducing a new function. A new system setup was built to enable the measurement of full field wafers as large as 156 mm×156 mm. Furthermore, the inventive system can capture the whole wafer image including the edges, enabling accurate determination of boundary conditions for stresses at the edge of the silicon wafer. Finally, using the shear difference method, the full stress components are calculated from the photoelasticity parameters.

The present invention provides a robust, non-destructive optical method to determine the stress state in a whole field view of a thin silicon sheet. The first step in obtaining full components of the stresses from the measured maximum shear stresses is to resolve the ambiguity of the photoelastic parameters, including isoclinic and isochromatic phase maps. A six step or ten step phasing method is used to extract the photoelastic parameters from the measurement. The isoclinic angle is extended from $[-\pi/4, \pi/4]$ to $[-\pi/2, \pi/2]$ using the arctan 2 function. Applying the shear difference method, the full components of stresses can be then found by accurately introducing the boundary conditions.

Figure 6:
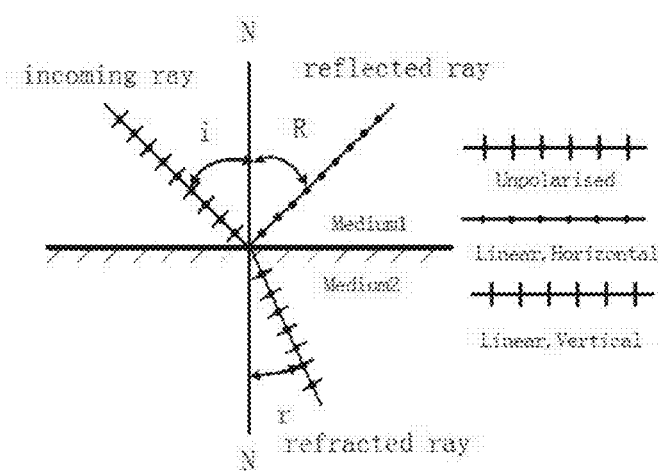
FIG. 6 illustrates Snell's Law of refraction and reflection.

When light passes through a homogeneous isotropic media, such as glass, it is governed by Snell's Law of refraction and reflection as shown in FIG. 6. FIG. 6 illustrates the reflection and refraction of an incoming light ray I. The reflected light R is plane polarized, and the refracted light r is a single light ray without polarization.

Figure 7:
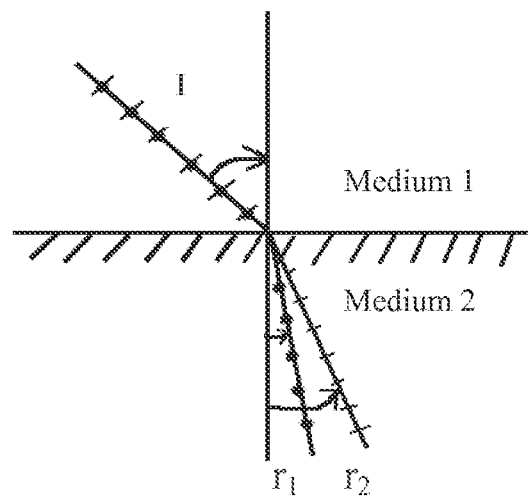
FIG. 7 illustrates the passage of light through an anisotropic crystal media.

Certain crystalline solids, such as silicon carbide, which are optically anisotropic, will refract a single incident ray and produce two refracted rays, called ordinary $r_1$ and extraordinary $r_2$ rays, as shown in FIG. 7. This phenomenon is called double refraction or birefringence. One of the refracted rays is extraordinary in the sense that it violates Snell's law so that the ray in an anisotropic solid travels at a different speed and direction to that of the ordinary ray. The two indices of refraction for the ordinary and extraordinary rays are equal only in the direction of an optical axis. An optical axis is a line along which there is some degree of rotational symmetry in an optical system, such as a camera lens or microscope. In a doubly refracting crystal, the optical axis is the line in the direction for which no double refraction occurs. The ordinary and extraordinary rays are plane polarized and their planes of polarization are orthogonal.

If the incident rays are parallel to the optic axis, the ordinary ray and the extraordinary ray will travel in the same direction and behave as if in an isotropic medium. However, if the incident light ray is perpendicular to the optic axis, the extraordinary ray will travel faster but in the same direction as the ordinary ray. The photoelastic phenomenon occurs when the incident rays are perpendicular to the optic axis. The two rays coming out of the crystal are then perpendicular and polarized. When the light emerges, the relative phase difference between the refracted rays will form fringes.

Crystalline silicon has a diamond cubic crystal structure, and there is no double refraction effect in the stress free state.

Figure 8:
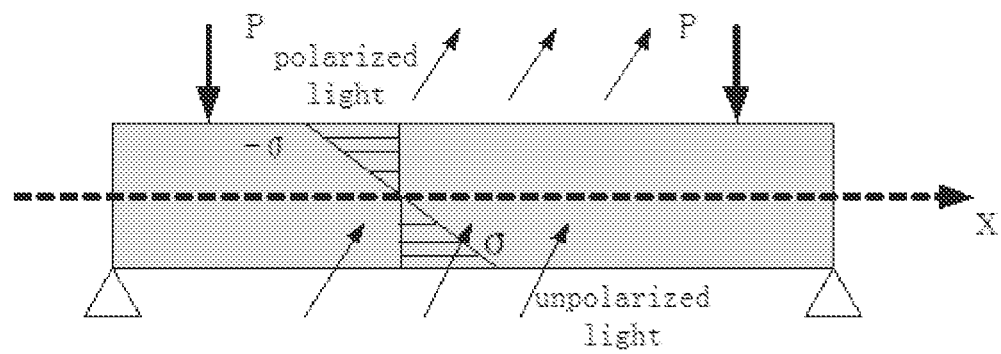
FIG. 8 illustrates light passing through a single crystal silicon four point bending beam.
Figure 9:
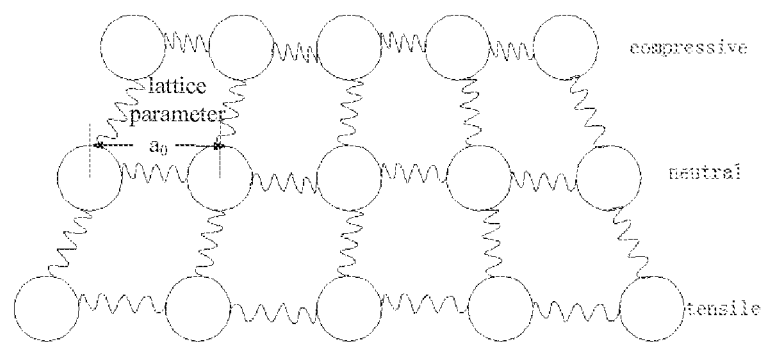
FIG. 9 illustrates a simple cubic atomic arrangement of atoms and the strain under bending for the beam of FIG. 8.
Figure 10:
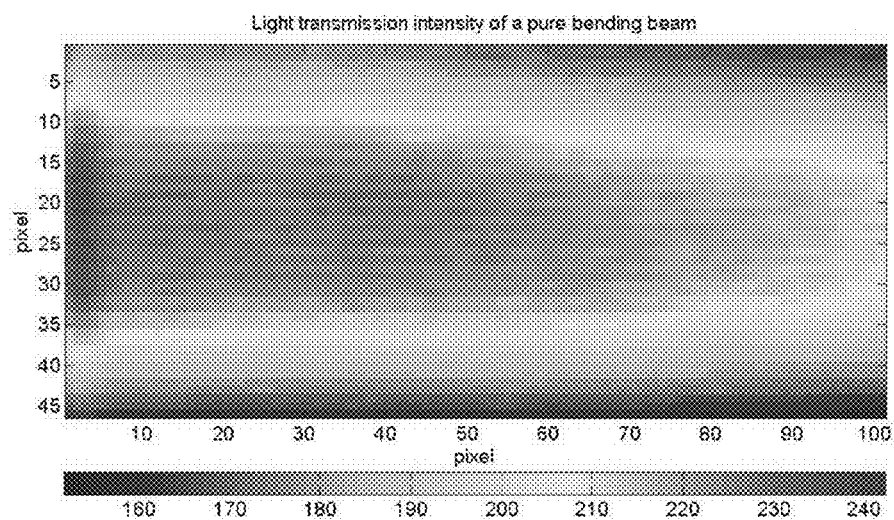
FIG. 10 illustrates a light transmission intensity image of the pure bending region for the beam of FIG. 8.
Figure 11:
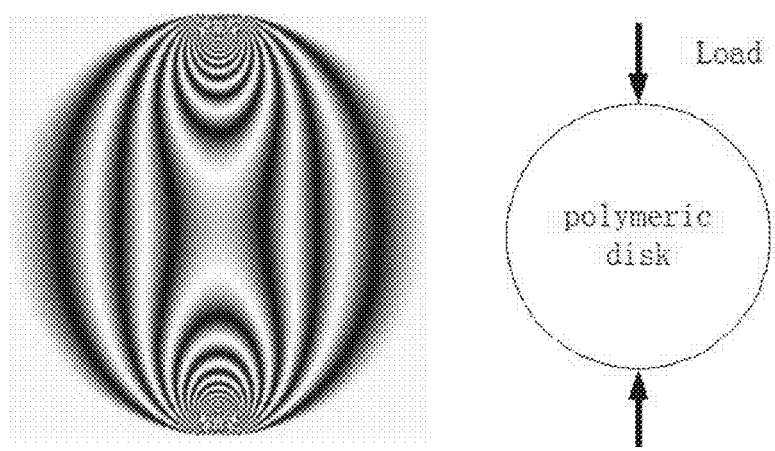
FIG. 11 illustrates the photoelastic fringes of a polymeric disk under compression.

The existence of stress will induce strain which results in optically anisotropic behavior. Silicon wafers are generally thin, flat plates and are assumed to exhibit plane stress. As explained above, photoelasticity occurs when the incident rays are perpendicular to the optic axis. FIGS. 8-10 illustrate how double refraction occurs in the special case of a thin, single crystal wafer that is subjected to four point bending. FIG. 8 is an illustration of the stress state of a thin silicon beam loading on edge. FIG. 9 shows an example of strain at the atomic scale with the assumption that the crystal is simple cubic. In four point bending, the strain at the top part of the beam compresses the atom bonds (the crystalline lattice), while the tensile strains at the bottom part of the beam stretch the atom bonds. When unpolarized light passes through the single crystal beam, the electric and magnetic field of the light interacts with the electrons of the atoms. Double refraction occurs due to the strain difference between the horizontal direction and vertical direction. For example, at the top part of the beam, compressive strain in the horizontal direction makes atoms more closely packed compared to the vertical direction, where the strain is zero. Thus, the light ray traveling in the horizontal direction is slower than the light ray traveling in the vertical direction. When the two rays emerge, there is phase difference between them. FIG. 10 illustrates the light transmission intensity image captured by an infrared camera of infrared light transmitted through a simple crystal silicon wafer 0.2 mm thick, undergoing four point bending. The light transmitted in the middle is more intense than at the edges because of double refraction. Double refraction changes the polarization state of the emerging polarized beam, and this change results in the formation of fringe patterns. Fringes are not observed for the beam of FIG. 8 because the stress levels and the thickness are small. For comparison, FIG. 11 shows the fringes captured from a polymeric compression disk observed by a polariscope, where fringes can be seen clearly.

The experimental setup to evaluate birefringence is called a polariscope. A polariscope can convert birefringence into fringes and the number of the fringes is proportional to the stress magnitude. The results obtained from the polariscope are photoelastic parameters, namely isochromatic and isoclinic, which represent the magnitude and direction of the principal stresses, respectively. The photoelastic parameters are converted to maximum shear stress using an isotropic or anisotropic stress-optic law. In 1853, Maxwell related the birefringence to stress through the stress-optical law which is expressed in Equation 1:

$$2\tau_{max} = |\sigma_1 - \sigma_2| = \frac{\lambda}{2\pi tC}\delta \quad (1)$$

where C is the stress-optic coefficient, t is the thickness of the sample, $\lambda$ is the wavelength of the light source, $\sigma_1$, $\sigma_2$ are the two principal stresses, $\delta$ is the phase difference between the two refracted rays and is called phase retardation, and $\tau_{max}$ is the maximum shear stress and is related to the absolute value of the difference between the largest and smallest principal stresses.

Figure 12:
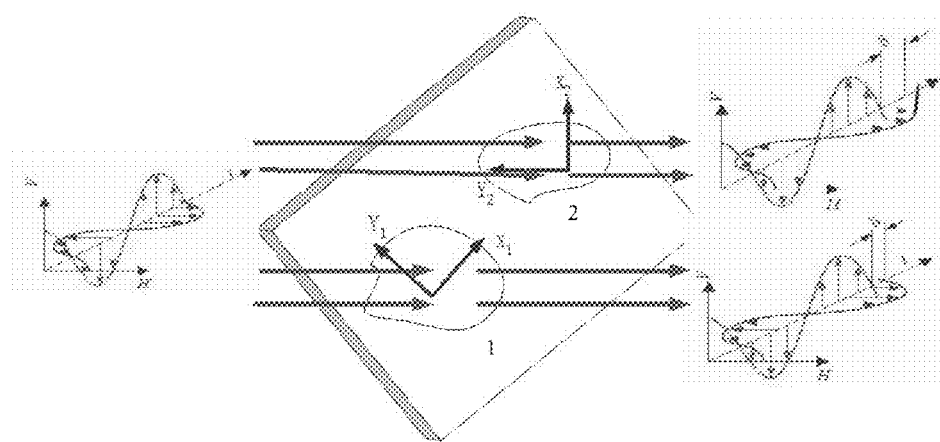
FIG. 12 illustrates a demonstration of light transmissions through stressed multi crystalline silicon.

FIG. 12 demonstrates how the stress optic law relates to a multi-crystalline material such as silicon. In FIG. 12, the stressed sample contains two different grains which are stressed with different stress magnitudes. Since the stress magnitude is different for the two grains, the phase difference of the refracted rays is also different, resulting in different light transmission.

Figure 13:
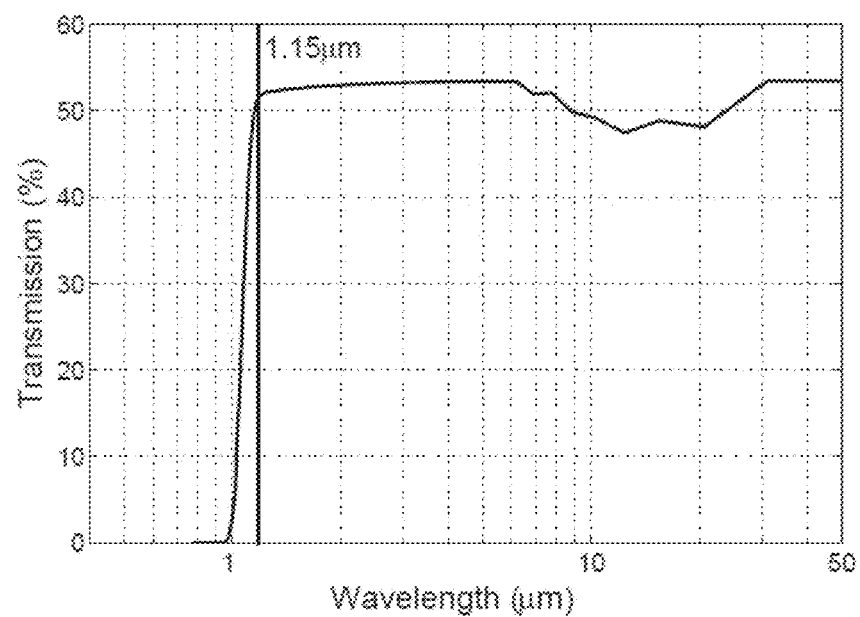
FIG. 13 illustrates the transmission spectrum of silicon.

When light passes through a crystalline solid, the photons interact with the atoms of the solid, where some photons with a wavelength shorter than the band gap are absorbed and converted to charge carriers, and other photons are transmitted. The transmission spectrum for silicon in FIG. 13 shows that silicon is opaque to the ultraviolet and visible light, but the transmission ratio rises sharply to over 50% at around 1100 nm, being almost constant in the whole near infrared spectrum range. A wavelength of 1150 nm, which is close to the edge of the transparent window, is a preferred light source. This wavelength can be obtained using a broad spectrum light source in conjunction with an interference band pass filter with a bandwidth of 10 nm.

Figure 14:
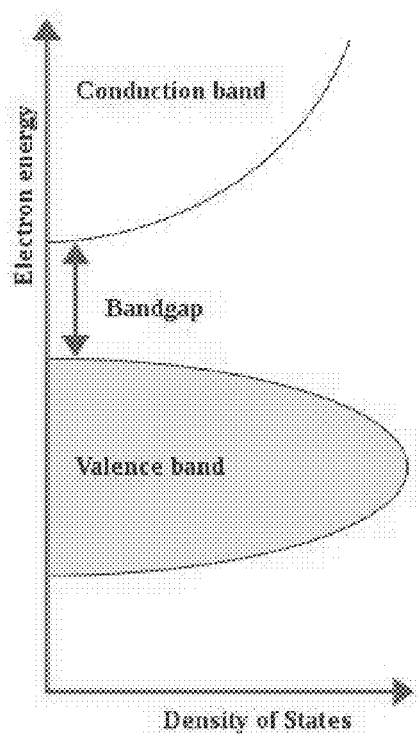
FIG. 14 illustrates the band gap of a semiconductor.

The light transmission spectrum is related to the band gap of crystal silicon. The band gap generally refers to the energy difference between the top of the valence band and the bottom of the conduction band; it is the amount of energy required to raise a valence electron into the conduction band. FIG. 14 is a crude schematic of the band gap in a semiconductor. For crystal silicon, at room temperature, the band gap is approximately 1.1 eV. Photons that contain energy higher than the band gap will be absorbed. The wave length of the photon containing energy with 1.1 eV is about 1150 nm. Thus, most of the visible light is absorbed and only the IR light is transmitted.

Figure 15:
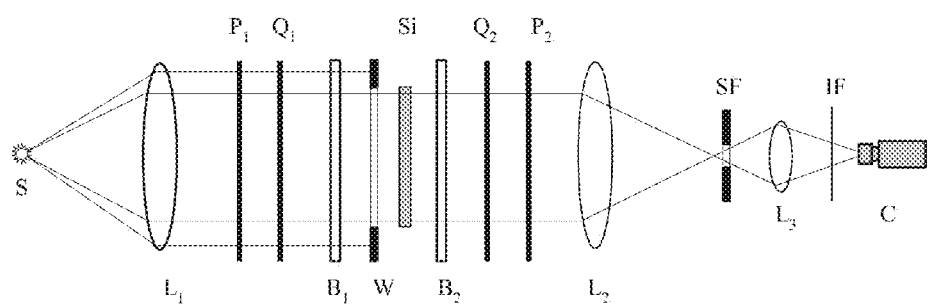
FIG. 15 illustrates a circular polariscope.

FIG. 15 shows a schematic diagram of the principal features of a circular polariscope. The setup includes a white light tungsten-halogen lamp, two spherical lenses 240 mm in diameter, two near infrared linear polarizers 100 mm in diameter, two first-order quarter waveplates with a wavelength of 1150 nm and 100 mm in diameter, two beam splitters of 240 mm in diameter, a specimen stage, a spatial filter, an interference filter with a wavelength of 1150 nm and half magnitude full width (HMFW) of 10 nm, an imaging lens of 75 mm in diameter, a high-sensitivity infrared digital video camera, an image grabber board, and a computer. The system preferably is placed on an optic table, and can be used to measure samples as large as 240 mm in diameter for fully collimated light. Larger samples can be measured using a diverging light beam as described below.

The light emitted from the tungsten light source S will pass through the first spherical lens $L_1$, where the light beams are collimated. After the beam passes the first polarizer $P_1$, the light will be plane polarized. In the six step method, the optic axis of the first quarter waveplate $Q_1$ is kept at 45° relative to the first polarizer $P_1$. Thus, after the light passes through the first quarter waveplate $Q_1$, it will be circularly polarized. The purpose of the two beam splitters $B_1$, $B_2$ is to increase the sensitivity of the polariscope. The light passes through the sample and is reflected back and forth several times, and thus the photoelastic retardation is amplified by the number of times light travels through the sample.

The opaque window W is used to block stray light from entering the system. Stray light can result in artifacts in the captured images, and thus adversely impact the accuracy and resolution of the measurements. When the collimated circularly polarized light enters the sample, double refraction will occur if the sample is stressed. Silicon (Si) will act as a waveplate if it contains residual stresses. The polarization state of the light will be further changed by the sample based on the magnitude of the maximum shear stress and the principal stress orientation. In order to determine the phase change caused by the sample, another quarter waveplate $Q_2$ and polarizer $P_2$ is used to review the state change of the light. The light is then focused by the second spherical lens $L_2$. In the case where partial mirrors are used to increase the sensitivity, a spatial filter is added in order to pick the correct magnification of the system. Finally, another lens $L_3$ will further focus the light before it enters the camera C.

Figure 16:
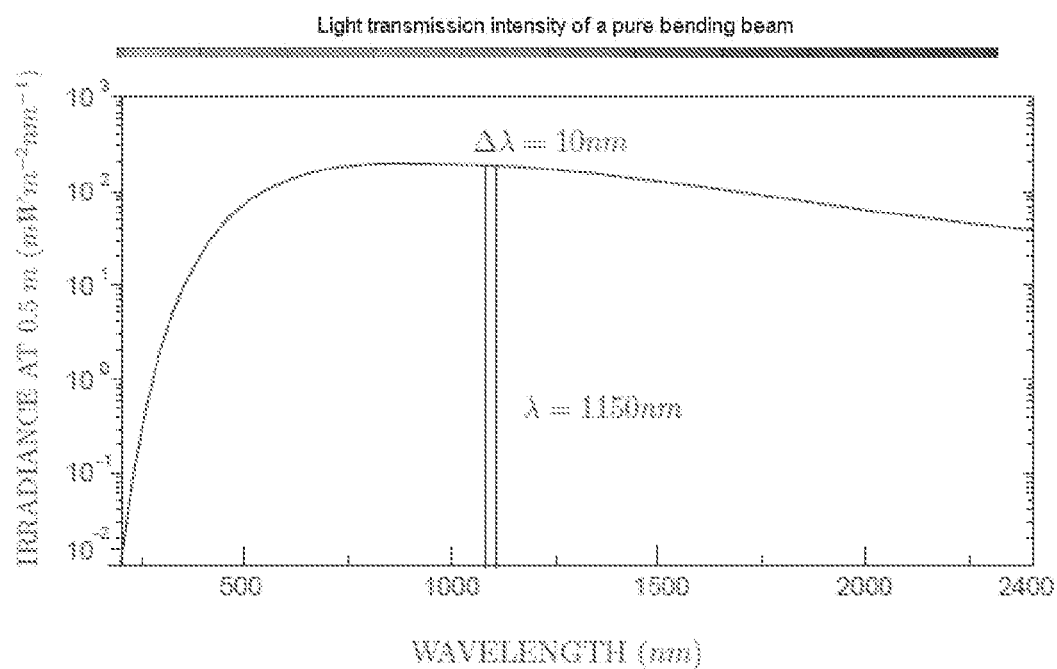
FIG. 16 illustrates the relationship between power and wavelength in a tungsten light source.

The light source S preferably is a tungsten-halogen lamp, the typical spectrum of which is shown in FIG. 16. The spectrum covers a broad range in both the visible and near infrared regions. As shown in the figure, the band pass filter only selects a bandwidth $\Delta\lambda=10$ nm, which significantly reduces the light intensity. The lost intensity can be compensated for by using a higher output power of the tungsten-halogen bulb. With a 150 W bulb, the remaining power after narrow band filtering is over 200 mW, which is acceptable for the full field measurement. To further compensate for the excessive loss in high fringe multiplication, a broad band pass filter with a FMHW of 100 nm can be used at the cost of wavelength mismatch in the quarter waveplates. Using an infrared laser is another choice for the light source S, especially due to the benefit of reducing the loss in spatial resolution in fringe multiplication. But the self-interference normally dominates the photoelastic fringes of low stress. Therefore, the tungsten-halogen bulb is preferred for the near infrared point light source for the system.

Figure 17:
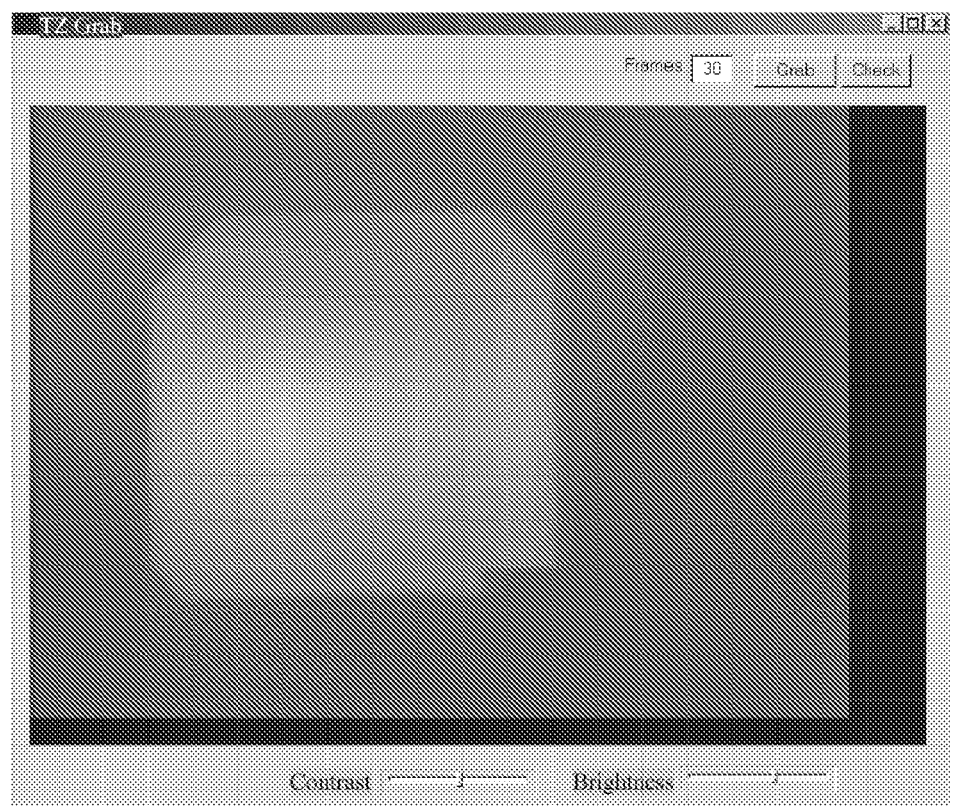
FIG. 17 illustrates a computer screenshot image of the image grabbing program.

The digital camera C, which preferably is focused on the wafer surface, is connected to an image grabber board installed on a computer. The gray-level images are digitized by the grabber preferably with at least 640×480 pixels and a depth of 8 bits, or 256 gray levels. The digitized images normally contain electronic noise, especially when using high camera gains and for dark images, which can result in high inaccuracy for stress calculations. In order to reduce the noise, 30 to 300 sequentially grabbed images are averaged out with respect to the same object, thus the random noise can be minimized at the expense of taking a little more time for grabbing the images. A preferred image grabbing software, TZGrab, is implemented in Microsoft Visual C++ with a Windows interface shown in FIG. 17. This software is capable of adjusting image contrast and brightness, checking for the saturation, filtering electronic noise, and saving images. The optimal images captured are those with highest maximum allowed brightness and reasonable contrast. The brightness is limited by the 256 gray levels of the digitizer. For low stress, normally the first image in the phase stepping has the highest brightness and will be adjusted to the maximum gray level as 255 by increasing the image contrast and brightness or increasing the light power. The saturation of the image can be checked by pressing the "Check" button, which detects the percentage of pixels that are saturated. Usually the percentage is controlled at 0.2% to avoid excessive saturation. It may be beneficial to repeat the adjustment of the brightness and contrast several times. It should be pointed out that no further adjustment is made during phase stepping.

Wafers used for solar cells are generally very thin, usually 100 to 300 um. As can be seen from the stress optic law shown in Equation 1, the phase difference of the emerging light rays is proportional to the sample thickness. Thus, for silicon wafers, only partial fringes can be obtained as shown in FIG. 10. Fringes are not present, but only the light intensity difference from the edge to the center is seen. Thus, stress cannot be evaluated by fringe counting techniques.

Phase stepping can be used to extract photoelastic parameters from the transmitted light automatically in the case of partial fringes. For a general setup as shown in FIGS. 8-10, the light emerging from the analyzer is not location dependent and the measured intensity will take the form $$I(x,y) = I_m + I_a [\sin 2(\beta-\alpha) \cos \delta - \sin 2(\theta-\alpha) \cos 2(\beta-\alpha) \sin \delta] \quad (2)$$

where I is the image captured by the camera, $I_m$ takes into account stray light; $I_a$ is the light power (which is the intensity emerging when the axes of the specimen and all the optical elements in the polariscope are parallel), $\alpha$ and $\beta$ are the orientation angles between the reference axis and the slow axis of the analyzer, second quarter waveplate respectively, and $\theta$ is the isoclinic angle.

As there are four unknowns in Equation 2, at least four independent equations need to be used for solving this equation. By selecting six angular combinations of the second quarter waveplate $Q_2$ and the second analyzer, as shown in Table 1, six simultaneous equations containing the unknowns of phase retardation $\delta$ and isoclinic angle $\theta$, are generated, which can be used to solve for these two unknowns.

TABLE 1 six phase stepping of a circular polariscope

| φ | β | Light Intensity |
|---|---|---|
| 0 | π/4 | $I_1 = I_m + I_a(1 + \cos\delta)/2$ |
| 0 | −π/4 | $I_2 = I_m + I_a(1 − \cos\delta)/2$ |
| 0 | 0 | $I_3 = I_m + I_a(1 − \sin 2\theta \sin \delta)/2$ |
| π/4 | π/4 | $I_4 = I_m + I_a(1 + \cos 2\theta \sin \delta)/2$ |
| π/2 | π/2 | $I_5 = I_m + \frac{I_a}{2}(1 + \sin 2\theta \sin \delta)$ |
| 3π/4 | 3π/4 | $I_6 = I_m + \frac{I_a}{2}(1 − \cos 2\theta \sin \delta)$ |

The simultaneous equations are solved for $\theta$ and $\delta$ as:

$$\theta = \tfrac{1}{2}\alpha \tan(I_5 − I_3, I_4 − I_6) \quad (3)$$

$$\delta = \alpha \tan[(I_5 − I_3)\sin 2\theta + (I_4 − I_6)\cos 2\theta, I_1 − I_2] \quad (4)$$

which give $\theta$ in the range of $-\pi/4$ to $\pi/4$ and $\alpha$ in the range of $-\pi/2$ to $\pi/2$. The isoclinic angle is also the principal stress orientation. In order to represent all of the random stress states, the range of $\theta$ given by Equation 3 is not sufficient, and at least a $\theta$ in the range of $-\pi/2$ to $\pi/2$ is needed. This is a system ambiguity and will be discussed below.

Alternatively, a 10-phase stepping method can be used. Table 2 shows the simultaneous equations to be solved.

TABLE 2 ten phase stepping of a circular polariscope

| φ | ζ | η | β | Light Intensity |
|---|---|---|---|---|
| π/2 | — | — | 0 | $I_1 = I_b + I_a \sin^2 \frac{\delta}{2} \sin^2 2\theta$ |
| 5π/8 | — | — | π/8 | $I_2 = I_b + \frac{I_a}{2} \sin^2 \frac{\delta}{2} [1 − \sin 4\theta]$ |
| 3π/4 | — | — | π/4 | $I_3 = I_b + I_a \sin^2 \frac{\delta}{2} \cos^2 2\theta$ |
| 7π/8 | — | — | 3π/8 | $I_4 = I_b + \frac{I_a}{2} \sin^2 \frac{\delta}{2} [1 + \sin 4\theta]$ |
| π/2 | 3π/4 | π/4 | π/2 | $I_5 = I_b + \frac{I_a}{2}[1 + \cos\delta]$ |
| π/2 | 3π/4 | π/4 | 0 | $I_6 = I_b + \frac{I_a}{2}[1 − \cos\delta]$ |

TABLE 2-continued ten phase stepping of a circular polariscope

| φ | ζ | η | β | Light Intensity |
|---|---|---|---|---|
| π/2 | 3π/4 | 0 | 0 | $I_7 = I_b + \frac{I_a}{2}[1 - \sin2\theta\sin\delta]$ |
| π/2 | 3π/4 | π/4 | π/4 | $I_8 = I_b + \frac{I_a}{2}[1 + \cos2\theta\sin\delta]$ |
| π/2 | π/4 | 0 | 0 | $I_9 = I_b + \frac{I_a}{2}[1 + \sin2\theta\sin\delta]$ |
| π/2 | π/4 | 3π/4 | π/4 | $I_{10} = I_b + \frac{I_a}{2}[1 - \cos2\theta\sin\delta]$ | where φ is the orientation of polarizer, β is the orientation of the analyzer (the second polarizer), ζ is the orientation of the first quarter wave plate with respect to the slow optical axis, η is the orientation of the second quarter wave plate with respect to the slow optical axis, and θ is the orientation of the principal stress. The simultaneous equations are solved for θ and δ as:

$$\theta = \frac{1}{4}\tan^{-1}\left(\frac{I_4 - I_2}{I_3 - I_1}\right) \quad (5)$$

$$\delta = \tan^{-1}\left(\frac{(I_9 - I_7)\sin2\theta + (I_8 - I_{10})\cos2\theta}{I_5 - I_6}\right) \quad (6)$$

Appendix A provides pseudo codes for the 10-step and 6-step processes. Either six phase or ten phase stepping may be used. For ease of explanation, six phase stepping will be discussed herein, though it should be noted that the ten phase stepping method could be substituted in place of the six phase stepping method.

Double refraction is an inherent property of stressed material and is not limited to silicon wafers. The only requirement is that the proper wavelength of light be chosen for the material so that the material is transparent. Then the phase stepping method can be used to calculate the two photoelastic parameters, and by applying stress optic law, the maximum shear stress can be calculated.

In the PV industry, approximately 80% of the silicon wafers used to fabricate cells are multi-crystalline, and this number is increasing due to the lower cost of multi crystalline wafer production. For multi crystalline silicon wafers, different crystal grains affect light transmission differently due to different atom densities along the light transmission direction for each crystallographic grain crystal orientation. In order to measure multi crystalline wafers correctly and accurately, the stress optic law is extended by adding the new factor of crystal grain orientation, which makes the theory more comprehensive and complete, and enables more accurate measurement and analysis of residual stresses using the polariscope. For both single and multi crystalline wafers, grain orientation information needs to be considered. It is very time consuming to use x-ray diffraction (XRD) to determine grain orientations for multi crystalline wafers. However, because light transmission is a function of the grain orientation, it can be used to determine the grain orientations. In this manner, the polariscope system in conjunction with analytical software is shown to be capable of identifying grain orientations automatically.

Another trend in the photovoltaic industry is that wafers are becoming larger and larger to reduce production costs. Presently, 156 mm by 156 mm wafers are widely used. Known polariscopes can only measure a small portion of a sample at a time, with diameters of the measured area ranging from 25 mm to 75 mm. It would require taking ten to twenty separate measurements, each comprised of six to ten images depending on the stepping method used to fully evaluate a 156 mm×156 mm wafer using existing systems. A new setup to measure whole area, or full the field of the wafers in one measurement was designed and built. The new system enables the in situ measurement of large wafers.

Due to inherent system ambiguity, a polariscope can only measure the maximum shear stress. The system ambiguity is resolved mathematically by introducing a new function which extends the range of the isoclinic angle to −π/2 to π/2, and it can be shown that in conjunction with the novel setup, the full stress state can be calculated using the shear difference method (SDM). Another critical consideration for SDM is how to properly capture the boundary conditions. By using the new setup, the entire periphery, and thus all edges, of the silicon wafer are imaged, thus enabling the use of the edges as boundary conditions for calculation of stresses. The methodology was verified by successfully obtaining the full stress state for a silicon beam sample subjected to four point bending and evaluated with the novel setup.

Figure 18:
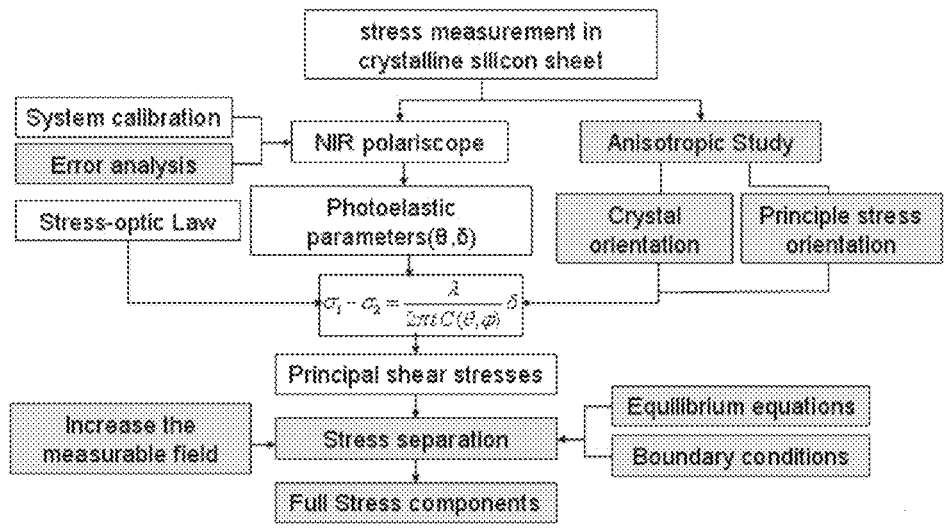
FIG. 18 illustrates a flow chart for a method of using a polariscope to measure the full stress components in crystalline silicon.

A flow chart for the polariscope method is shown in FIG. 18. The shaded boxes are the discussed in detail herein. The objective is to measure the full stress components in crystalline silicon. To ensure the reliability of the polariscope, an error analysis is conducted. The system is calibrated for both the principal stress orientation and crystal orientation so as to expand the method to multiple crystalline silicon wafers. The novel polariscope is used to capture the edges of the wafers. By applying boundary conditions and equilibrium equations, the full stress components are eventually obtained.

The isotropic stress optic law was shown as Equation 1. For an isotopic material, the maximum shear stress is proportional to the phase retardation of light. Shijiang He et. al. demonstrated that the stress orientation also influences the phase change of the transmitted light. He extended the stress optic law by replacing a constant stress optic coefficient with a stress orientation dependent stress optic coefficient as shown in Equation 7, where θ is the principal stress orientation.

$$\sigma_1 - \sigma_2 = \frac{\lambda}{2\pi t C(\theta)}\delta \quad (7)$$

The stress optic coefficients are not only a function of the principal stress orientation, but also a function of individual crystal grain orientations. This is because different grain orientations have different atom alignments and atom densities. For example, the ratio of atom density for silicon between (111) and (100) is 2:1. Thus, light speed is different when it passes through different orientations.

The most general case of the stress optic law is shown in Equation 8. In Equation 8, the stress optic coefficients are functions of both the crystal orientation φ and the principal stress orientation θ.

$$\sigma_1 - \sigma_2 = \frac{\lambda}{2\pi t C(\theta, \varphi)}\delta \quad (8)$$

The stress optic law is used to calculate the maximum shear stresses if the stress optic coefficient is known. In Equation 8, C is the stress optic coefficient, which is a function of θ (the principal stress orientation) and φ (the crystal grain orientation), t is the thickness of the sample, λ is the wavelength of the light source, $\sigma_1$, $\sigma_2$ are the maximum and minimum principal stresses, and δ is the phase retardation.

Stress optic coefficients need to be calibrated before the polariscope can be used to measure the residual stresses in silicon wafers. The process to obtain the stress optic coefficients is the reverse procedure to that of stress measurement. To calibrate the stress optic coefficient for an orientation, a known stress field is applied. The applied stress should be large enough so that the residual stress, if any, can be ignored, and more preferably, a sample containing very low residual stresses should be used.

Stress optic coefficients for (001) and (111) orientations have been derived and calibrated by Shijiang He and S. Danyluk. The cast silicon was taken to have the isotropic coefficient of the (111) orientation of silicon.

Figure 19:
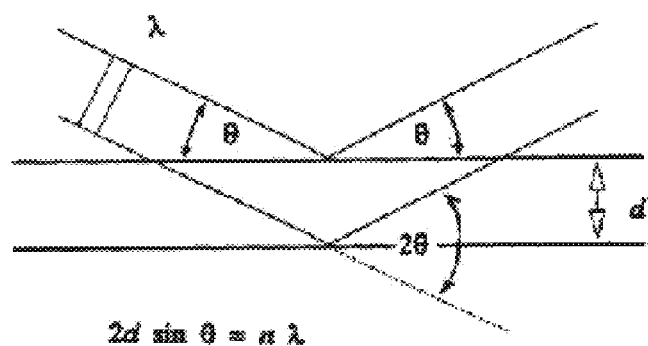
FIG. 19 illustrates the principle of Bragg's Law.

V. Garcia used a back Laue procedure to determine the crystal orientation in cast wafers. Since silicon has a well known crystal structure, the Laue system can be used to check the orientation of the grains with respect to the surface by analyzing the x-ray diffraction pattern. A pattern reflected by a certain orientation can be pre-determined by knowing the crystal structure (diamond cubic for silicon) and invoking Bragg's law as shown in FIG. 19.

Figure 5:
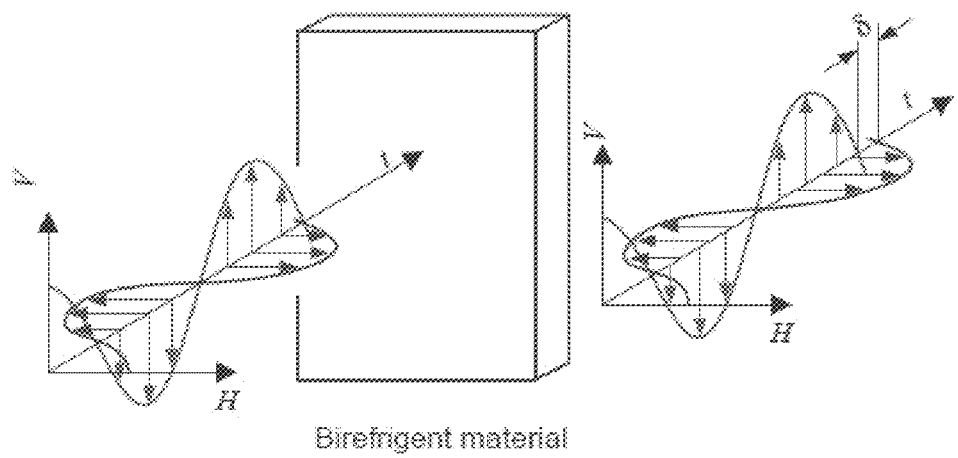
FIG. 5 illustrates the effect of birefringence.
Figure 20:
FIG. 20 illustrates an optical image of the multi crystalline silicon wafer beam.
Figure 21:
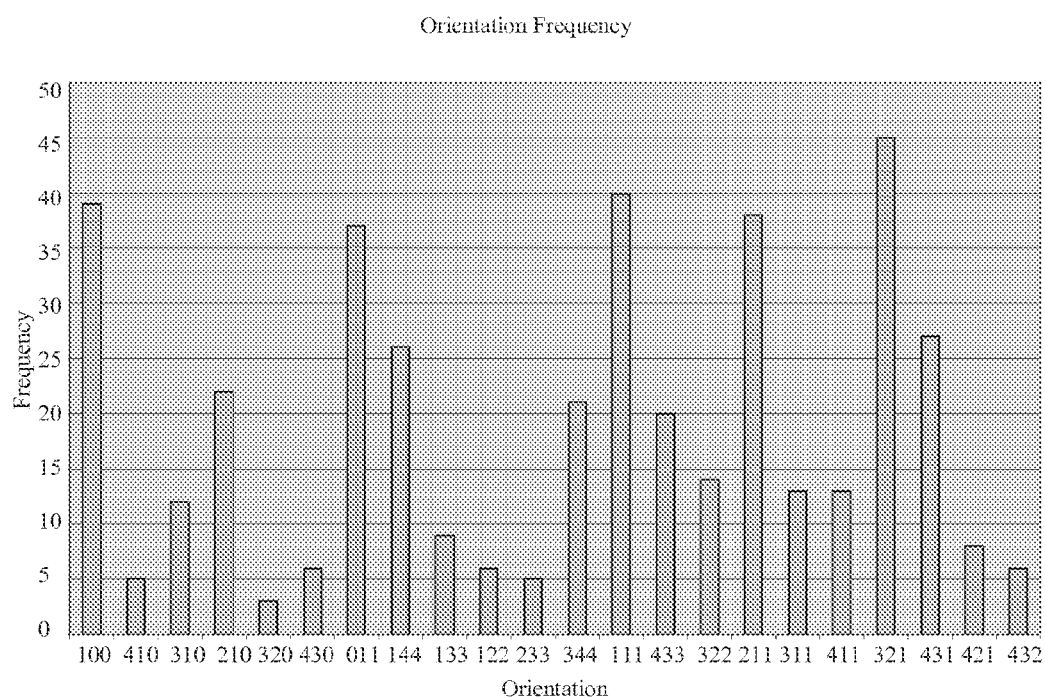
FIG. 21 illustrates orientation frequency versus crystal grain orientations.

FIG. 20 is an optical image of a silicon beam cut from a 156 mm×156 mm cast silicon wafer. Table 3 lists the grain orientations (corresponding to the φ value in Equation 7) and the rotations (which is the pole angle of the grain corresponding to the θ value in equation 7) of a multi crystal wafer beam. A graph summarizing the frequency of the grain orientations for a group of cast wafers is shown in FIG. 21. As can be seen, the majority of the orientations are (100), (011), (111), (211) and (321). FIG. 5.3 also demonstrates that there is a great deal of variation of the wafer grain orientations, thus it is necessary to calibrate the stress optic coefficients for each grain orientation.

TABLE 3 grain characterization of a multi crystalline silicon beam

| Grains | 3 | 6 | 8 | 9 | 10 | 14 | 16 | 17 | 24 |
|---|---|---|---|---|---|---|---|---|---|
| Orientations(φ) | 344 | 211 | 100 | 211 | 321 | 432 | 321 | 211 | 321 |
| Rotations(θ) | −23 | −69 | 60 | −71 | −100 | −42 | 60 | 31 | 131 |

Figure 22:
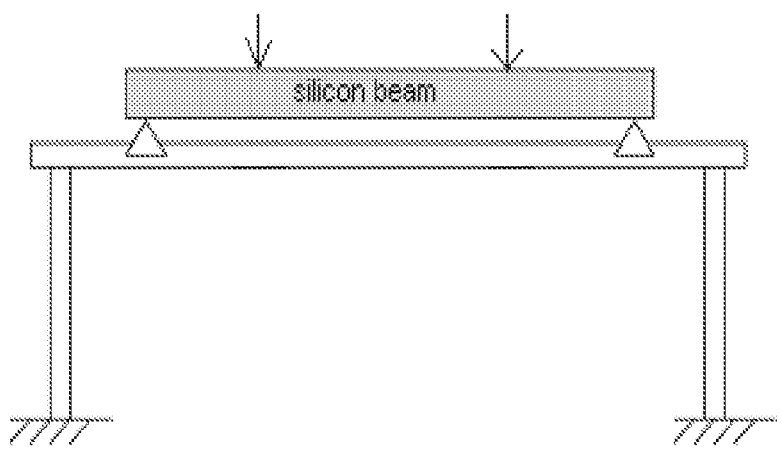
FIG. 22 illustrates the four point bending setup.

Four-point bending, shown in FIG. 22, is used to apply known stresses in order to calibrate the anisotropic stress optic coefficients. Silicon beams with dimensions 150 mm×10 mm×0.2 mm are removed by dicing from 156 mm×156 mm cast wafers. The static load is applied by adding weight to a four point bend test fixture that holds the silicon beam sample. The residual stresses in the beams can be assumed small compared to the applied stresses.

Figure 23:
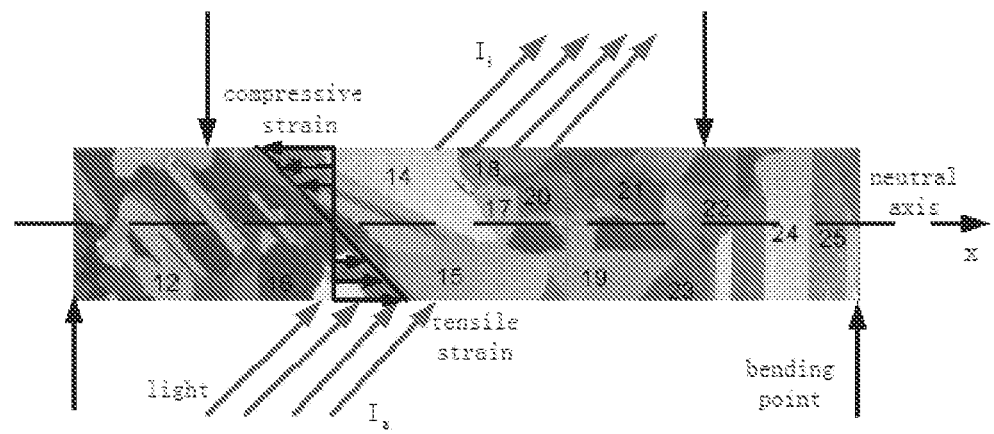
FIG. 23 illustrates a multi crystalline bending wafer beam in the polariscope.

FIG. 23 shows a schematic of a multi crystalline wafer loaded by four-point bending, sitting in the polariscope system. Compressive strain is observed in the half portion above the neutral axis, and tensile strain is observed in the half portion below the neutral axis. $I_a$ is the light source intensity. $I_i$ is the light intensity captured by the camera and i is from 1 to 6, which represents light intensity of the six images captured from six phase stepping method.

Figure 24:
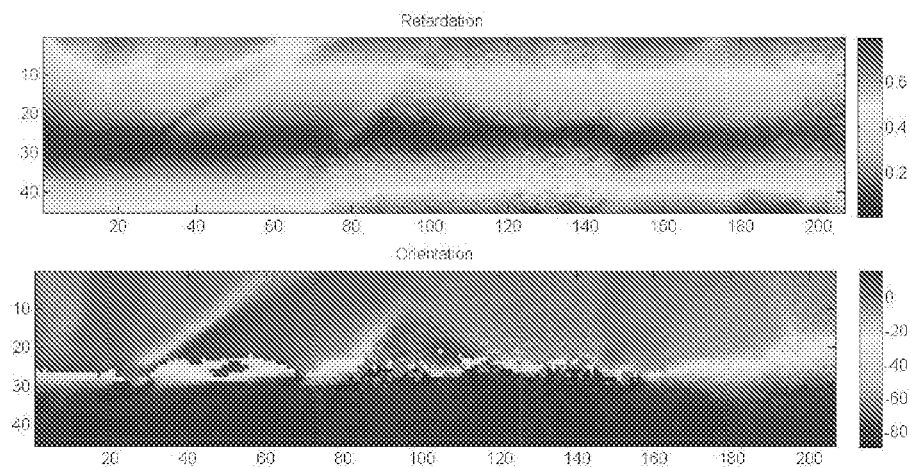
FIG. 24 illustrates phase retardation and isoclinic angle of a bending cast wafer beam.

Phase retardation and the isoclinic angle are calculated using Equations 3 and 4, respectively. FIG. 24 shows a typical result of the retardation δ and isoclinic angle of a multi crystalline cast wafer. The physical size of the measured area is approximately 40×10 mm, captured over 200×50 pixels in the camera. The retardation is nearly uniform along the longitudinal direction and linear along the transverse direction. The non-uniformity phase retardation along the horizontal direction is due to the anisotropic light transmission among the grain orientations.

Figure 25:
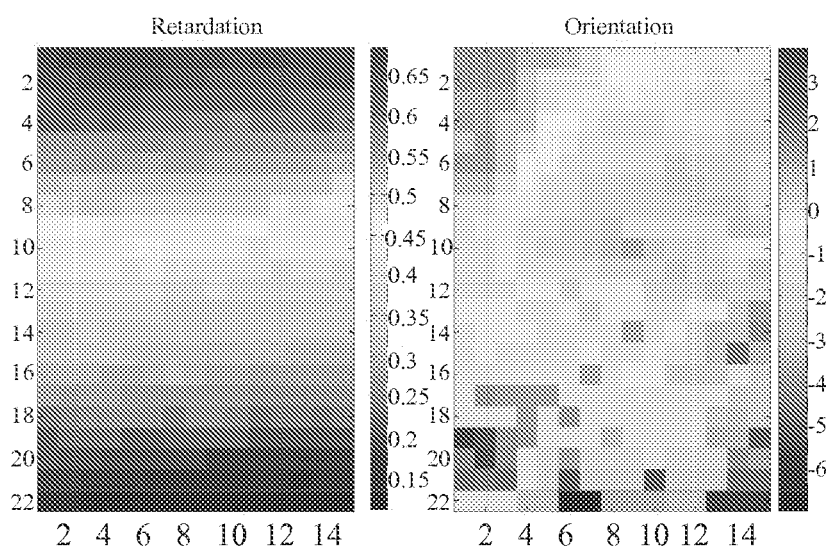
FIG. 25 illustrates the phase retardation and isoclinic angle of grain 14 of FIG. 23.

In order to calibrate a grain of interest, only a portion of the pure bending beam needs to be studied. FIG. 25 shows the phase retardation and isoclinic angle of grain 14 in FIG. 23. Within a single grain, the phase retardation is uniform, which suggest that the stress optic coefficients are constant throughout the grain.

Usually the maximum stress is used for purposes of characterization. However, the maximum stress cannot be determined with enough accuracy because the edges of the beam are not clearly defined in the images, and a variation of one pixel, or 0.2 mm, can introduce an error of 5%. The stress optic coefficient is related to the slope of the retardation, dδ/dy, which can be determined with high accuracy using a linear least-square fit method. FIG. 26 is the least-square fit of the retardation to the vertical location relative to the neutral axis. The double refraction, which is related to δ, is plotted versus the vertical location (relative to the center of the beam). The correlation coefficient of the linear fit is 0.98. The principal stresses for pure bending are $$\sigma_1 = \frac{M}{I} y, \sigma_2 = 0 \tag{9}$$

where $I = h^3 t/12$ is the moment of inertia of the cross section, M is the applied moment, and y is the vertical location from the center. By substituting Equation 9 into Equation 8, the stress optic coefficients can be obtained in terms of the slope of the retardation as shown in Equation 10:

$$C = \frac{\frac{d\delta}{dy}}{\left(\frac{2\pi t}{\lambda}\frac{M}{I}\right)} \tag{10}$$

Table 4 shows the stress optic coefficients for grains of cast wafers. About 80 different grains orientations and pole angles were measured. For those grains orientations that are not covered, a linear fit can be used to determine the stress optic coefficient. The observed magnitude of the maximum stress optic coefficient is approximately 1.7 times that observed for the minimum stress optic coefficient.

TABLE 4 stress optic coefficients of grains with a certain pole angle.

| Orientations (φ) | 100 | 111 | 111 | 111 | 210 | 211 | 321 | 322 | 421 |
|---|---|---|---|---|---|---|---|---|---|
| Rotations (θ) | 20 | 53 | −5 | 65 | −8 | 31 | −100 | 106 | 73 |
| Stress optic coefficient($10^{-11} \times Pa^{-1}$) | 2.40 | 2.54 | 2.53 | 2.55 | 2.08 | 2.75 | 1.87 | 2.35 | 1.75 |

In order to apply the calibrated stress optic coefficients to measure stresses for different grains, crystal orientations for each grain must first be determined. The most general technique to determine grain orientation is x-ray diffraction, which was discussed above. X-ray diffraction is a point method and usually takes several hours to measure a 156 mm×156 mm cast wafer, which is not acceptable for in situ measurement for the photovoltaic industry. Shijiang He used an average stress optic coefficient for multi crystalline silicon wafers to enable in situ measurement. However, due to large variation of stress optic coefficients, the accuracy of the measurement is decreased about 35%.

Figure 29:
FIG. 29 illustrates a typical infrared transmission intensity image of a multi crystalline silicon wafer.

The transmitted light intensity is correlated to the orientation determined by x-ray diffraction, which is usually called optically anisotropic. When light passes through stress free single crystal silicon, no anisotropic can be observed. The light transmission image captured by the infrared camera is uniform as shown in FIG. 27, which is a (100) single crystal silicon wafer. The uniformity of the image shows that at a stress free state, single crystal silicon is optically isotropic. FIG. 28 is a light transmission image of a (111) single crystal wafer under the same light power. FIGS. 27 and 28 indicate that the (111) orientation has much higher light transmission rate than (100) orientations. Thus, multi crystalline silicon wafers, which contain all kinds of grain orientations, are optically anisotropic. A typical infrared transmission intensity image of a multi crystalline silicon wafer is shown in FIG. 29. It can be seen that some grains are much brighter than the others. This correlation was validated by comparing infrared transmission to grain orientations from several wafers. Samples were prepared by dicing wafers into 125 mm×10 mm beams. An optical image of one beam is shown as FIG. 30. Each grain is labeled by a number for later reference. X-ray diffraction was used to determine orientations of each grain and light transmission images were taken by the infrared camera using the polariscope system. One such image is shown in FIG. 31.

Figure 30:
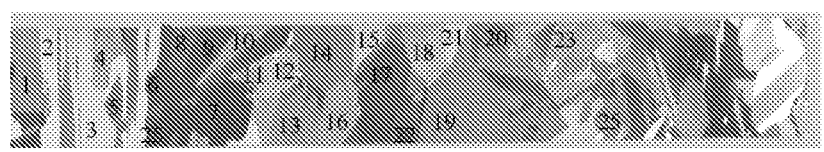
FIG. 30 illustrates a photograph of a multi crystalline silicon wafer beam.
Figure 31:
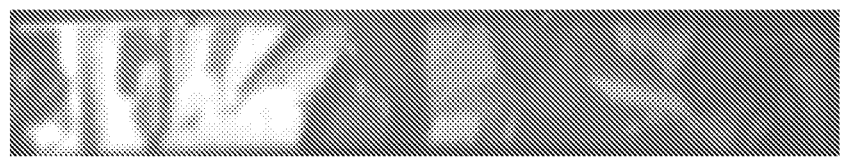
FIG. 31 illustrates an infrared transmission intensity image of the multi crystalline silicon wafer beam of FIG. 30.

It can be readily verified that the intensities of FIG. 30 and FIG. 30 are inversely correlated. If a grain in the optic image is bright, then it appears dark in the light transmission image. Table 5 summarizes the light intensity of some grains from both the optical image and the transmission image, which verified that optical image and transmission image are inversely correlated.

TABLE 5 gray levels of different grains in both optical image and transmission images

| Grain ID | Optical Image | Transmission Image |
|---|---|---|
| A4-10 | bright | dark |
| A4-14 | bright | dark |
| A4-16 | bright | dark |
| A4-17 | medium | medium |
| A4-26 | bright | dark |
| A4-3 | dark | bright |
| A4-6 | dark | bright |
| A4-8 | bright | dark |
| A4-9 | dark | bright |
| A5-1 | bright | dark |
| A5-11 | bright | dark |
| A5-12 | dark | bright |
| A5-15 | medium | medium |
| A5-22 | bright | dark |
| A5-4 | bright | dark |
| A5-5 | medium | medium |
| A7-5 | dark | bright |
| A7-7 | bright | dark |
| A7-8 | middle | median |

Grain orientations as identified by the miller indices are correlated to the image intensity as shown in Table 6, from which it can be seen that some orientations transmit infrared light better than other orientations. Among the three major directions (111), (110), and (100), (111) directions have the brightest light transmission.

TABLE 6 orientations and gray levels of transmission image for different grains

| Orientation | Grain ID | Rotation | Transmission image |
|---|---|---|---|
| 100 | I7-3 | 5 | dark |
| 100 | I5-18 | 20 | dark |
| 100 | A2-12 | 30 | dark |
| 100 | G6-5 | 32 | dark |
| 100 | G9-3 | 32 | dark |
| 100 | G9-5 | 32 | dark |
| 100 | G5-1 | 35 | dark |
| 100 | G5-5 | 45 | dark |
| 100 | G5-6 | 46 | dark |
| 100 | A4-8 | 60 | dark |
| 100 | I3-22 | 60 | dark |
| 111 | I2-8 | −5 | bright |
| 111 | I3-15 | 3 | bright |
| 111 | A8-12 | 4 | bright |
| 111 | I3-6 | 4 | bright |
| 111 | I6-10 | 5 | bright |
| 111 | G9-20 | 20 | bright |
| 111 | A7-5 | 25 | bright |
| 111 | A5-15 | 28 | bright |
| 111 | A5-21 | 28 | bright |
| 111 | A8-2 | 29 | bright |
| 111 | A5-12 | 30 | bright |
| 111 | A8-3 | 30 | bright |
| 111 | A8-4 | 30 | bright |
| 111 | A8-5 | 30 | bright |
| 111 | G9-15 | 30 | bright |
| 111 | I2-7 | 53 | bright |
| 111 | I5-17 | 65 | bright |
| 210 | A5-4 | −120 | median |
| 210 | A5-17 | −65 | median |
| 210 | G7-2 | −47 | median |
| 210 | G7-5 | −30 | median |
| 210 | I3-9 | −8 | median |
| 210 | A8-19 | 98 | median |
| 210 | A2-17 | 125 | median |
| 210 | A2-14 | 150 | median |
| 110 | B4-8 | 60 | median |
| 110 | B4-18 | 85 | median |
| 110 | AB-55 | 40 | median |
| 100 | AB-58 | 38 | median |
| 211 | A8-18 | −89 | median |
| 211 | A4-9 | −71 | median |
| 211 | A4-6 | −69 | median |
| 211 | I3-14 | −20 | median |
| 211 | I3-17 | −14 | median |
| 211 | G2-15 | 1 | median |

Based on Table 6, the grain orientations can be estimated. For a light transmission image of a multi crystalline wafer such as FIG. 29, which is an 8 bit image and has 256 gray levels, all the pixels that have a measured gray value greater than 200 are characterized as (111), those that have a measured gray value between 100 to 200 are characterized as (110), and the others which have a measured gray value of below 100 are characterized as (100). In this way, the measurement accuracy is substantially increased beyond the isotopic assumption, and accuracy is only 10% less than using all the individual grain orientation information. Because of the limited numbers of grains measured by x-ray diffraction, the characterizations of other grain orientations such as (432) were not obtained at this time. In addition, the infrared camera used in this setup does not have sufficient resolution to distinguish the difference between orientations such as (111) and (655), although alternate cameras/detectors or future technological improvements may enable this distinction.

Figure 32:
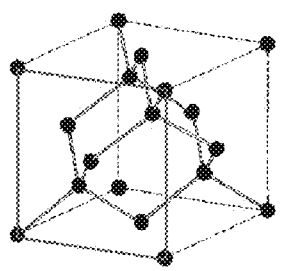
FIG. 32 illustrates the crystal structure of silicon for the (100) orientation.
Figure 33:
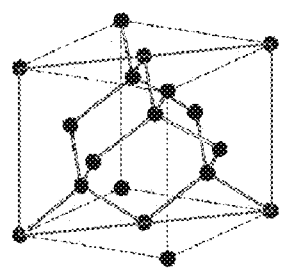
FIG. 33 illustrates the crystal structure of silicon for the (110) orientation.
Figure 34:
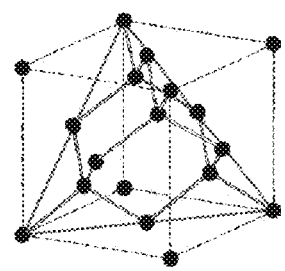
FIG. 34 illustrates the crystal structure of silicon for the (111) orientation.

The reason why light transmission varies with orientation can be explained by considering the crystal structure of silicon. Different orientations have varying atom densities and bond strengths. The atom density ratio between (111), (110), and (100) is 6:4:3 as shown in FIGS. 32-34, respectively. For the (111) orientations, since the in-plane atom density is higher, there are fewer atoms in the light path, which results in higher transmission rate.

As discussed above, the typical circular polariscope system shown in FIG. 15 is restricted by the size of the quarter waveplates and the polarizers, which is generally 25 mm to 75 mm. It would take ten to twenty measurements of six to ten steps each to measure a 156 mm×156 mm wafer using existing systems. After the piecewise measurement, all the measurements would need to be stitched together to form a complete image of the silicon wafer. This is computationally intensive, time consuming, and causes inaccuracies.

Figure 35:
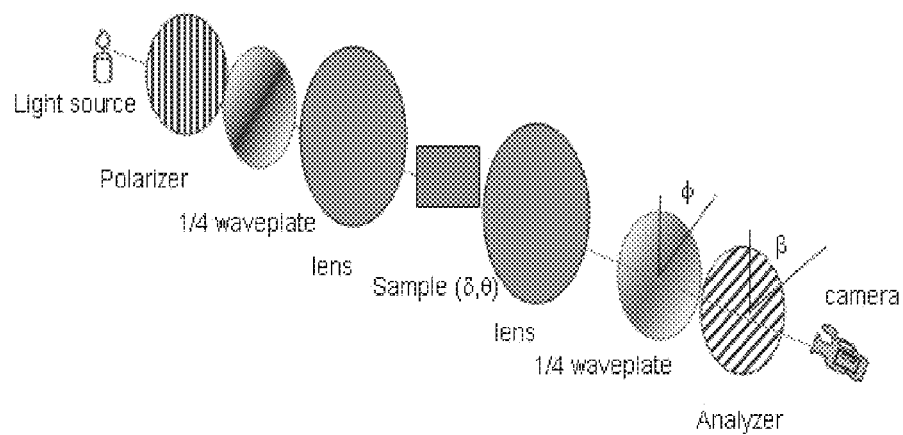
FIG. 35 illustrates a polariscope of the present invention.

A new setup of the polariscope is shown in FIG. 35. In the new system, the polarizers and quarter waveplates are moved outside of the lenses and so the illumination field is restricted only by the lenses. Two 240 mm lenses are used in the present system so that samples as large as 240 mm in diameter can be measured in a single set of stepped measurements. The new system setup enables in situ measurement of large wafers, including the detection of the wafer edges.

Figure 36:
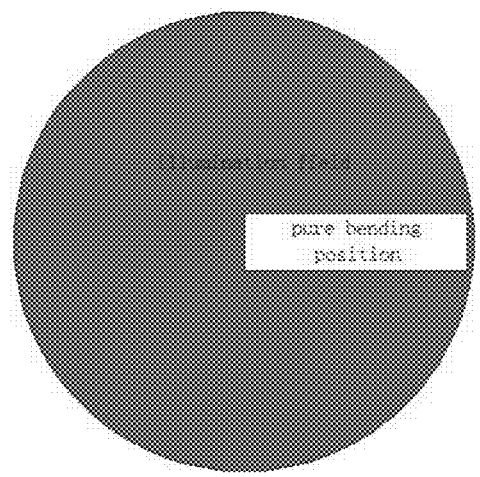
FIG. 36 illustrates the position of the beam in the polariscope system of FIG. 35.

Large field measurements are not without penalty. Due to the inclined light incident to the waveplates and the un-collimated light induced on the sample, there is an inaccuracy of the phase change of the light by the waveplates and sample. The problem can be overcome by calibrating the entire illuminating field. The system is center symmetric, so the calibration can be simplified to a calibration of a radial line from the center to the edge. FIG. 36 indicates the position of a beam in the inventive system. After calibration of a radius of the field, the results can be extended to the whole illumination field. The problem can also be overcome by design and selection of optical components that ensure the optical beam transmitted through the silicon wafer sample is fully collimated.

Figure 37:
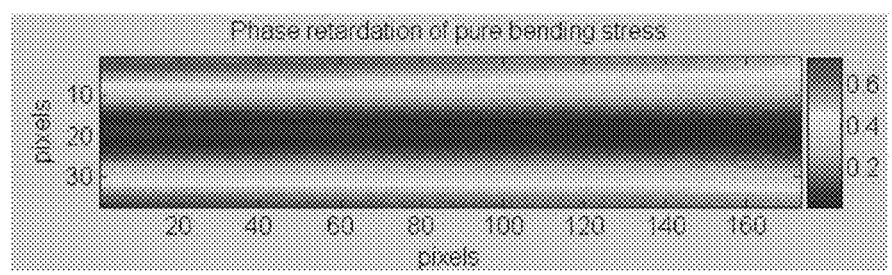
FIG. 37 illustrates a phase map of a four point bending beam cut from a CZ silicon wafer.

In order to facilitate calibration, a CZ single crystal wafer can be used to calibrate the system. The residual stresses in the CZ wafers can be assumed to be negligible compared to the applied stresses and rectangular beams cut from these wafers. FIG. 37 shows the phase retardation map of the CZ silicon beam. The left-most point of the image is the center of the illuminated field.

Figure 38:
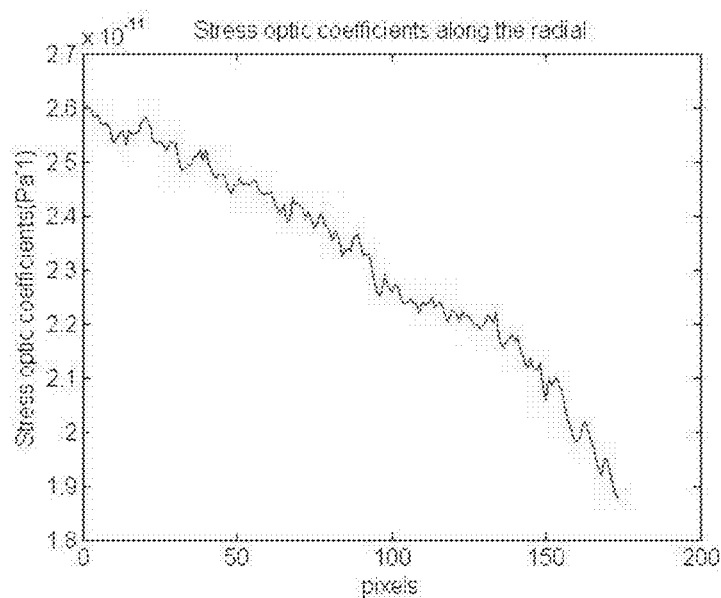
FIG. 38 illustrates the stress optic coefficients along the radius of the phase map of FIG. 27.

FIG. 37 shows that the phase map of the beam is observed to vary monotonically from center to edge, which indicates that the stress optic coefficients are different at each point of the radius. Stress optic coefficients were calculated for each cross section of the phase map using the same procedure described above, the results of which are shown in FIG. 38. The variation of the stress optic coefficients from center to edge is about 35%.

Figure 39:
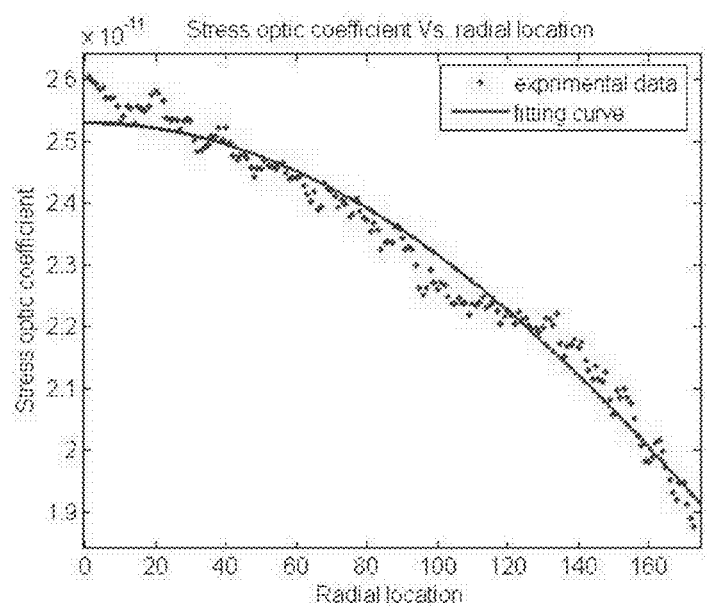
FIG. 39 illustrates data fitting of the stress optic coefficients for the polariscope system of FIG. 35.

The stress optic coefficients are only a function of radial location, x, since the system is centre-symmetric. A curve fitting using Equation 11 is shown in FIG. 39. The fitting result is shown as Equation 12. The R-square value is 0.97.

$$C = a \cdot \cos\left(\frac{x}{r}\right) + b \tag{11}$$

$$C = 1.32 \cdot 10^{-11} \cos\left(\frac{x}{r}\right) + 1.21 \cdot 10^{-11} \tag{12}$$

In Equation 12, C is the stress optic coefficient, x is the radial location, and r is the radius of the illuminating field. The results are close to the results measured by S. He, which is from 1.4 to $2.1 \cdot 10^{-11}$.

Combining Equation 12 and the stress optic law shown in Equation 7, a modified stress optic law for the new system setup is given in Equation 13. Applying Equation 13, the maximum shear stress $\tau_{max}$ of the whole field is calculated from a single set of stepped measurements for a 156 mm×156 mm wafer.

$$2\tau_{max} = \sigma_1 - \sigma_2 = \frac{1.32 \cdot 10^{-11} \lambda}{2\pi t C(\theta, \varphi) \cdot \left(\cos\left(\frac{x}{r}\right) + 0.92\right)} \delta \tag{13}$$

Figure 40:
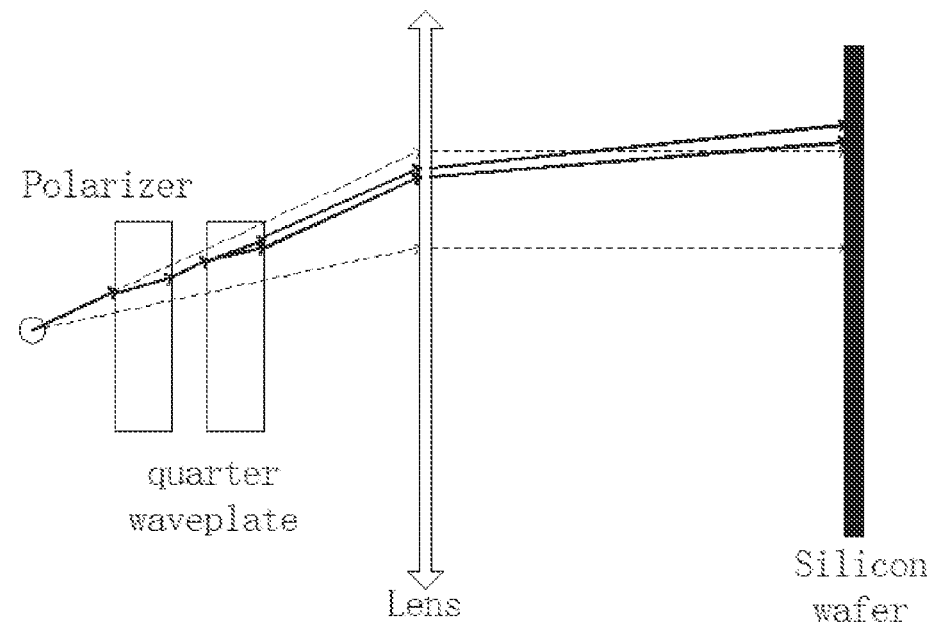
FIG. 40 illustrates light paths through the polariscope system of FIG. 35.

The radial dependant stress optic coefficients are due to the inclined incident light to the waveplates and silicon wafer as shown in FIG. 40, in which the dash lines are the line paths for the typical polariscope system as shown in FIG. 15. Since light is inclined to the waveplates, double refraction occurs. The path of light through the waveplates is longer than in the case where light is perpendicular to the waveplates. The relation between the path traveled by the inclined light and normal incident light to the waveplates is shown in Equation 14. The quarter waveplates no longer function as true quarter waveplates since the resulting phase change is greater than π/2. The relative inclination of the light to the sample can also result in additional phase changes of the silicon wafer.

$$L2 = \frac{L1}{\cos(\theta)} \tag{14}$$

Figures 41, 42:
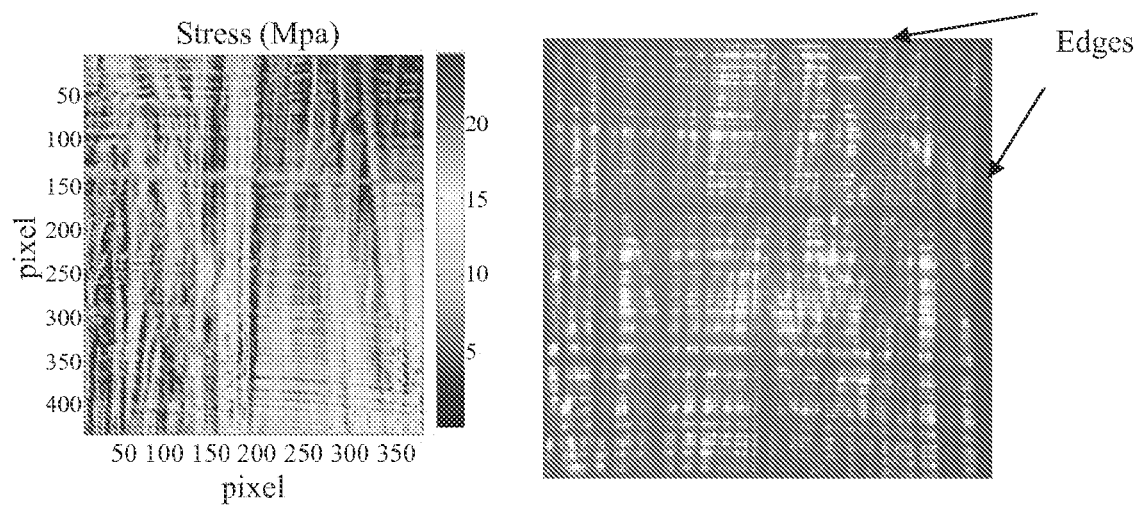
FIG. 41 illustrates a stress map of a 100 mm×100 mm EFG silicon wafer.
FIG. 42 illustrates a light transmission image of a 100 mm×100 mm EFG silicon wafer.
Figure 43:
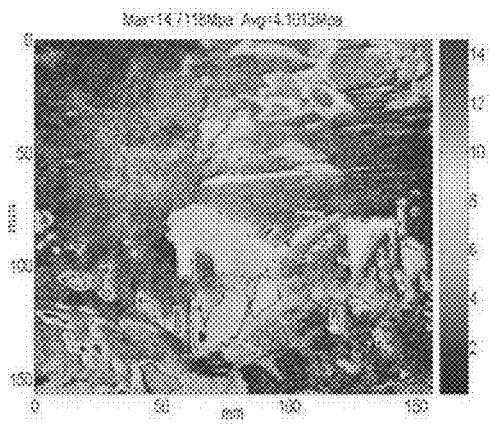
FIG. 43 illustrates a stress map of a 156 mm×156 mm cast silicon wafer.
Figure 44:
FIG. 44 illustrates a light transmission image of a 156 mm×156 mm cast silicon wafer.

A full field stress map is obtained using the radial dependant stress optic coefficients. FIG. 41 is the full field maximum shear stress of a 100 mm EFG wafer, and FIG. 42 is the light intensity image captured by the infrared CCD camera. The edges of the wafer are indicated by rapid transition to dark intensity in the image. FIG. 43 is the full field maximum shear stress of a 156 mm×156 mm wafer, and FIG. 44 is the corresponding light intensity image. The stresses are calculated using radial location dependant stress optic coefficient shown in Equation 13.

Figure 45:
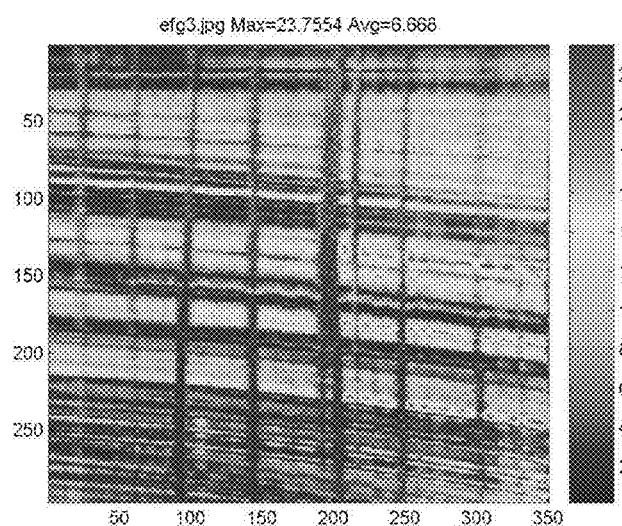
FIG. 45 illustrates stress measured by a typical polariscope.
Figure 46:
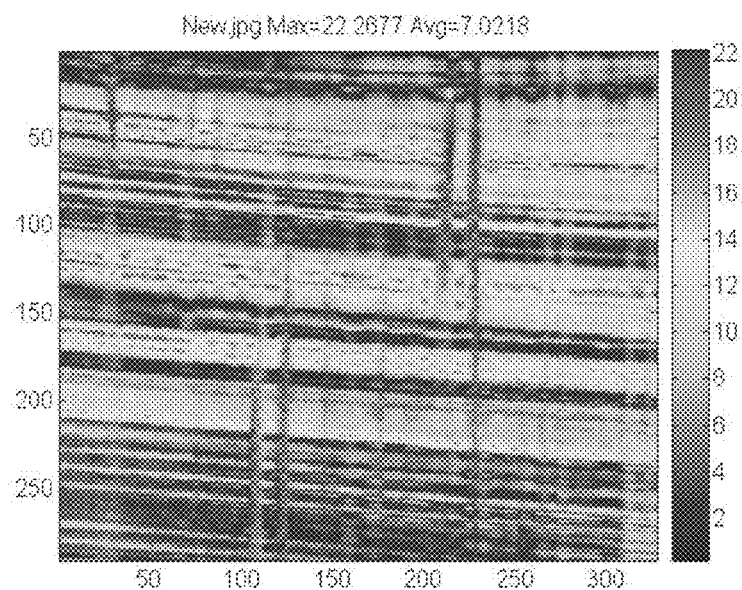
FIG. 46 illustrates stress measured by the polariscope of FIG. 35 for the same sample as FIG. 45.

To verify the result of the new system, the same location of an EFG wafer was measured by a the typical polariscope and the new polariscope. FIG. 45 is the stress result measured by the typical polariscope, and FIG. 46 is the stress result measured by the new polariscope. The difference is within 10%, which verified that the new polariscope is accurate to measure stresses in the wafers by using the location dependant stress optic coefficients given by Equation 13.

As mentioned above, the polariscope can measure the maximum shear stress in the thin silicon sheet, but the extraction of principal stresses, generally referred to as stress separation, is still a major issue in the measurement. The major difficulty for stress separation is that there are ambiguities to determine both the isoclinic and isochromatic parameters in the phase shifting photoelasticity. Another difficulty is that the most commonly used traditional stress separation techniques, such as the Lame-Maxwell (UM) method and the shear difference method, require stress information at the boundaries of the sample. To properly capture the whole wafer boundaries is critical to obtaining the full stress components. In the present invention, the shear difference method is used to automatically obtain the three stress components $\sigma_x$, $\sigma_y$, and $\tau_{xy}$. Compared to the other stress separation methods, this method can be used to extract full stress components not only for the applied stresses field, but also for residual stresses.

A good deal of work has already been done on stress separation. Researchers have been focusing on how to solve the system ambiguity when determining the maximum shear stress and principal stress orientation. T. Liu et al. used a two step loading method to solve the system ambiguity. With this method, the system ambiguity can be resolved when the two sequential applied loads are in the same direction, which is not applicable to a measure of the residual stresses. G. Petrucci and G. Restivo tried to separate stresses along stress trajectories by adjusting stress orientation empirically. M. Ramji and K. Ramesh used a ten step-phasing method and the technique uses domain masking to solve the ambiguity. In domain masking, a seed of high quality needs to be found in the phase map, which is not applicable in the case of residual stresses. The present invention focuses on obtaining the full stress components of the residual stresses by resolving the system ambiguity and applying the shear difference method.

Figure 47:
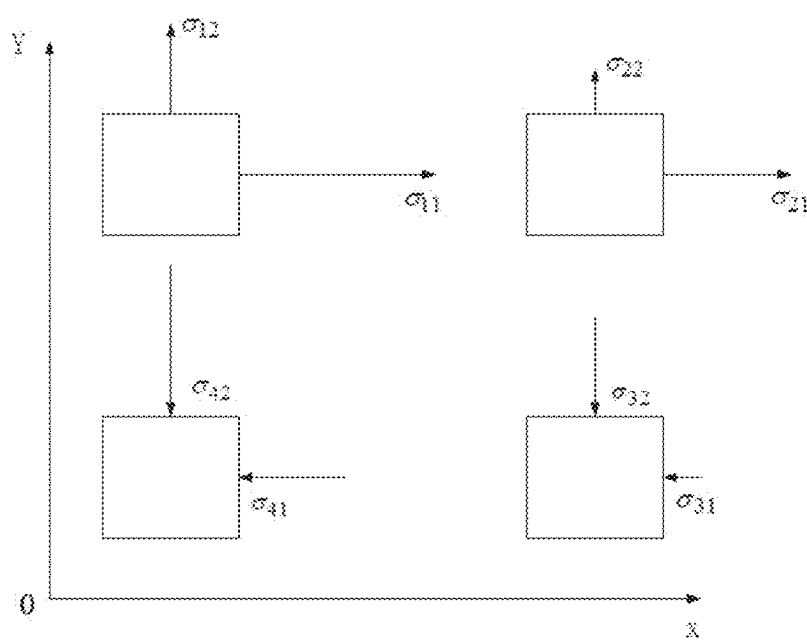
FIG. 47 illustrates a demonstration of the system ambiguity away from the edges.

FIG. 47 illustrates the concept of the system ambiguity. Four stress states are shown in FIG. 47 and described by Equation 15. The maximum shear stress of the four stress states is equal and the stress in the x direction is bigger than the stress in the y direction. The polariscope cannot distinguish between those four stress states since all of them have the same phase retardation and principal stress orientation. It is important to distinguish the tensile stress (case 1, 2) from the compressive stress (case 3, 4) since the tensile stress will initiate crack growth. Stress separation is the procedure to distinguish the system ambiguity and extract the normal stresses from the maximum shear stress that the polariscope measured.

$$2\tau_{max} = |\sigma_{11} - \sigma_{12}| = |\sigma_{21} - \sigma_{22}| = |\sigma_{31} - \sigma_{32}| = |\sigma_{41} - \sigma_{42}| \quad (15)$$

Figure 48:
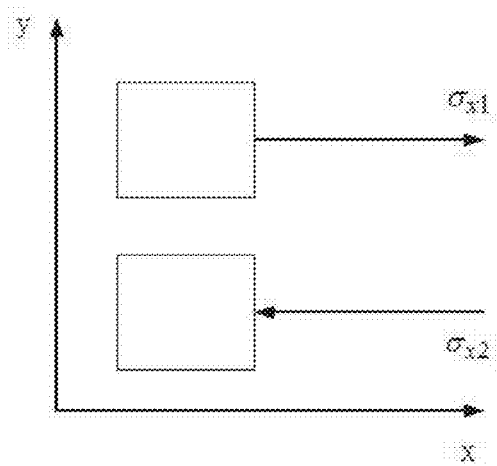
FIG. 48 illustrates the two stress states at the boundary.

FIG. 48 shows that there are only two stress states at the boundaries, either tensile or compressive along the tangential direction. The traction stresses including shear stress and normal stress in the y direction are zero.

As described above, a six phase stepping method was used herein to obtain the two photoelastic parameters, namely the phase retardation and the isoclinic angle. For both of these two parameters, the inverse trigonometric functions need to be solved as shown in Equations 3 and 4, and the solution of Equation 3 will only have a period of $\pi/2$, which is not sufficient to represent all of the stress states. In order to fully interpret all the directions of the random residual stresses, a new function arctan 2 is used to extend the period of stress orientation from $\pi/2$ to $\pi$.

Figure 49:
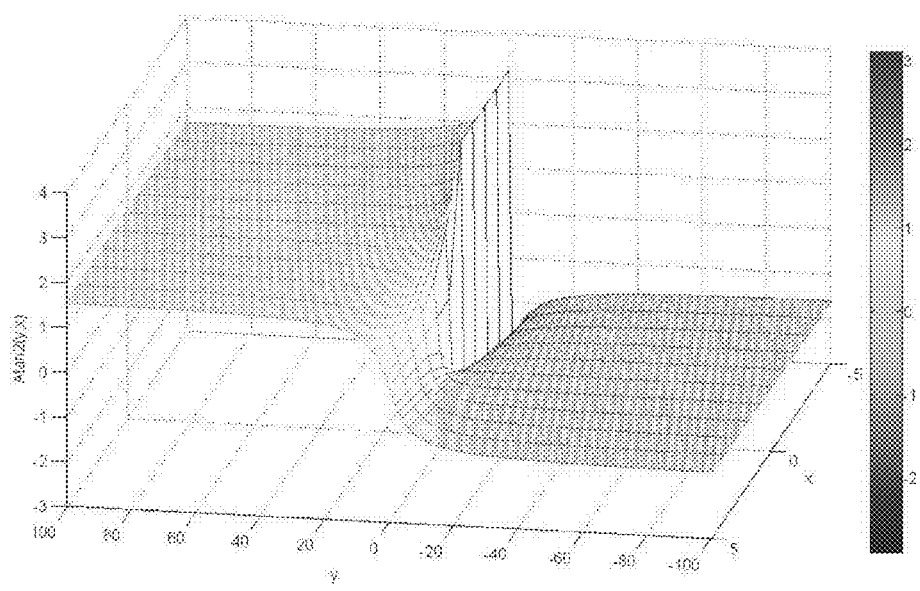
FIG. 49 illustrates a three dimensional plot of the arctan 2 function.

As expressed in Equation 16, arctan 2 is a function having a period of $2\pi$, and can be evaluated using mathematical software such as MATLAB. The standard arctan function has a range of $(-\pi/2, \pi/2)$. FIG. 49 is a three dimension plot of function arctan 2.

$$\text{atan2}(y, x) = \begin{cases} \arctan\left(\frac{y}{x}\right) & x > 0 \\ \pi + \arctan\left(\frac{y}{x}\right) & y \geq 0, x < 0 \\ -\pi + \arctan\left(\frac{y}{x}\right) & y < 0, x < 0 \\ \frac{\pi}{2} & y > 0, x = 0 \\ -\frac{\pi}{2} & y < 0, x = 0 \\ \text{undefined} & y = 0, x = 0 \end{cases} \quad (16)$$

Now the principal stress orientation $\theta$ and phase retardation $\delta$ can be calculated using the arctan 2 functions as shown in Equations 14 and 15 instead of Equation 3 and 4.

$$\theta = \tfrac{1}{2} a\tan 2(I_5 - I_3, I_4 - I_6) \quad (17)$$

$$\delta = a\tan 2[(I_5 - I_3)\sin 2\theta + (I_4 - I_6)\cos 2\theta, I_1 - I_2] \quad (18)$$

Using Equations 14 and 15, the range of stress orientation $\theta$ is extended from $(-\pi/4, \pi/4)$ to $(-\pi/2, \pi/2)$, and the range of phase retardation $\delta$ is extended from $(-\pi/2, \pi/2)$ to $(-\pi, \pi)$. Now mathematically both the stress orientation $\theta$ and the phase retardation $\delta$ are sufficient to represent all the possible stress states. The arctan 2 function chooses one solution from the two possible solutions from Equations 3 and 4 in the range of $(-\pi/2, \pi/2)$.

Figure 50:
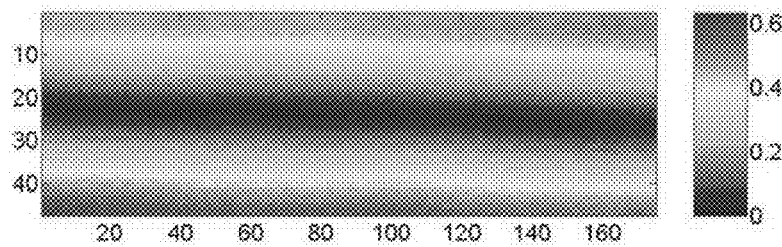
FIG. 50 illustrates a phase map calculated by the arctan 2 function.
Figure 51:
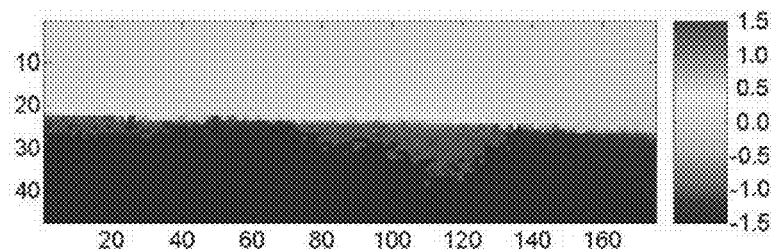
FIG. 51 illustrates the principal stress orientation calculated by the arctan 2 function.

By using the arctan 2 function, the polariscope system can completely distinguish the two stress states at the wafer edge boundaries. The principal stress orientations for the two stress states have a difference of $\pi/2$, though they have the same magnitude of maximum shear stress. FIGS. 50 and 51 are the phase map and principal stress orientation, respectively, calculated by the arctan 2 function for a single crystal pure bending beam. Clearly, by applying the arctan 2 function, the uniaxial stress states between compressive and tensile stress can be distinguished by the principal stress orientation measured by the polariscope as shown in FIG. 51.

Although the arctan 2 function can completely distinguish the stress states at the boundary (along the edges of the wafer), it cannot distinguish all of the stress states in the interior of the samples as shown in FIG. 47. In the present invention, the shear difference method is used to calculate the full stress components from the measurement of the polariscope. To use the shear difference method, boundary conditions at the edges of the wafer and a fully determined shear stress in the xy plane for the entire sample are needed, and by using arctan 2 function shear stresses in the xy plane are fully determined.

Table 7 shows the maximum shear stress calculated by the arctan 2 function and the sign of $\tau_{xy}$. The phase retardation $\delta$ is always positive, which leads to the fact that $\tau_{max}$ is always positive. This contradicts the fact that the stress state $\tau_{max}$ may be negative. Table 8 shows the calculated $\theta$ and $\delta$ using the second solution for $\theta$ in the range $[\pi/2, \pi/2]$. In this case, $\tau_{max}$ is negative. Tables 6 and 7 show that the in-plane shear stress $\tau_{xy}$ will hold the same value and sign no matter which $\theta$ value is chosen in the range of $(-\pi/2, \pi/2)$, which proves that the in-plane shear stresses are fully determined.

TABLE 7 shear stresses calculated by the arctan2 function

| $I_5 - I_3$ | $I_4 - I_6$ | $\sin 2\theta$ | $\cos 2\theta$ | $\theta$ | $\delta$ | $\tau_{max}$ | $\tau_{xy} = \tau_{max} \sin 2\theta$ |
|---|---|---|---|---|---|---|---|
| + | + | + | + | $(0, \pi/4)$ | + | + | + |
| + | − | + | − | $(\pi/4, \pi/2)$ | + | + | + |

TABLE 7-continued shear stresses calculated by the arctan2 function

| $I_5 - I_3$ | $I_4 - I_6$ | sin 2θ | cos 2θ | θ | δ | $\tau_{max}$ | $\tau_{xy} = \tau_{max}$ sin 2θ |
|---|---|---|---|---|---|---|---|
| − | + | − | + | (−π/4, 0) | + | + | − |
| − | − | − | − | (−π/2, π/4) | + | + | − |

TABLE 8 shear stresses calculated by using the second solution of θ in (−π/2, π/2)

| $I_5 - I_3$ | $I_4 - I_6$ | sin 2θ | cos 2θ | θ | δ | $\tau_{max}$ | $\tau_{xy} = \tau_{max}$ sin 2θ |
|---|---|---|---|---|---|---|---|
| + | + | − | − | (−π/2, −π/4) | − | − | + |
| + | − | − | + | (−π/4, 0) | − | − | + |
| − | + | + | − | (π/4, π/2) | − | − | − |
| − | − | + | + | (0, π/4) | − | − | − |

The equations of equilibrium for a free body in the x and y directions are shown in Equations 8 and 9, respectively.

$$\frac{\partial \sigma_y}{\partial y} + \frac{\partial \tau_{xy}}{\partial x} = 0 \tag{19}$$

$$\frac{\partial \sigma_x}{\partial x} + \frac{\partial \tau_{yx}}{\partial y} = 0 \tag{20}$$

Figure 52:
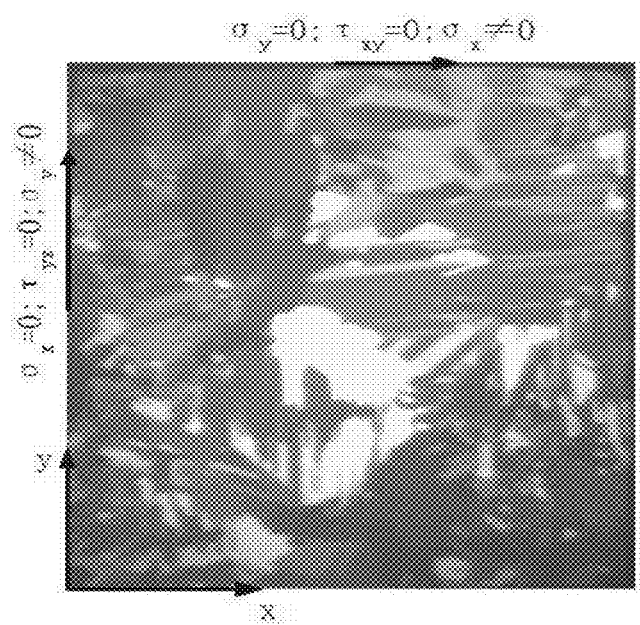
FIG. 52 illustrates boundary conditions of a 156 mm×156 mm cast silicon wafer.

Equations 16 and 17 can be converted to Finite Element Analysis (FEA) form, and at the free boundary of the edges of the silicon wafer or beam, traction forces are zero as shown in FIG. 52:

$$(\sigma_y)_j = (\sigma_y)_i - \int_i^j \frac{\partial \tau_{xy}}{\partial x} dy (\sigma_y)_{i=0} = 0 \tag{21}$$

$$(\sigma_x)_j = (\sigma_x)_i - \int_i^j \frac{\partial \tau_{yx}}{\partial y} dx (\sigma_x)_{i=0} = 0 \tag{22}$$

The sample boundaries must be properly captured when utilizing the shear difference method. To calculate the normal stress, shear stress in the xy plane must be calculated first. Equation 23 is the transformation of stresses to the xy plane coordinates, where shear stress in the xy plane can be obtained.

$$\sigma_{1,2} = \frac{\sigma_x + \sigma_y}{2} \pm \sqrt{\left(\frac{\sigma_x - \sigma_y}{2}\right)^2 + \tau_{xy}^2} \tag{23}$$

Equation 24 is used to calculate the principal stresses after normal stresses in the x and y directions are calculated using Equations 18 and 19, respectively.

$$\tau_{xy} = \frac{1}{2}|\sigma_1 - \sigma_2|\sin 2\theta = \tau_{max}\sin 2\theta = \frac{\lambda}{4\pi t C(\varphi, \theta)}\delta \sin 2\theta \tag{24}$$

To verify the shear difference method, four point bending, shown in FIG. 22, was used to introduce a known stress field to a silicon beam. The residual stresses in the wafers were assumed to be negligible compared to the applied stresses. To further simplify the calibration, CZ beams were used due to their lower typical residual stresses (near zero) and single crystal orientation.

The stress state of the CZ beam is shown as Equation 25, which is a pure bending stress state with maximum shear of 32 MPa. In Equation 25, y is the distance to the neutral axis.

$$\begin{bmatrix} \sigma_x & \tau_{xy} \\ \tau_{xy} & \sigma_y \end{bmatrix} = \begin{bmatrix} 32 \times \frac{y}{5} & 0 \\ 0 & 0 \end{bmatrix} \tag{25}$$

Figure 53:
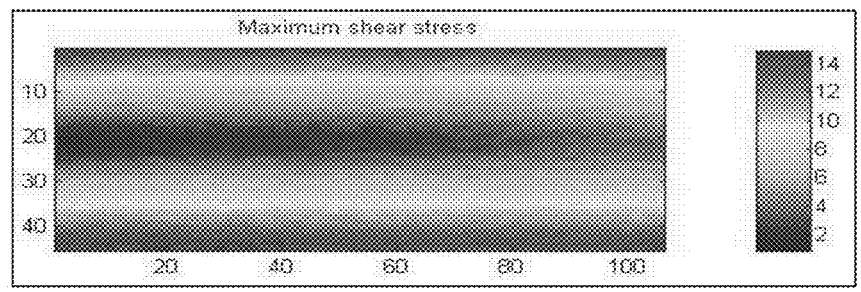
FIG. 53 illustrates bending stresses in a CZ silicon beam as measured by polariscope of FIG. 35.

The maximum shear stress measured by the polariscope system is shown in FIG. 53. Since the residual stress in the CZ wafers is assumed negligible, the stress state in FIG. 53 is very close to a pure bending stress.

Figure 54:
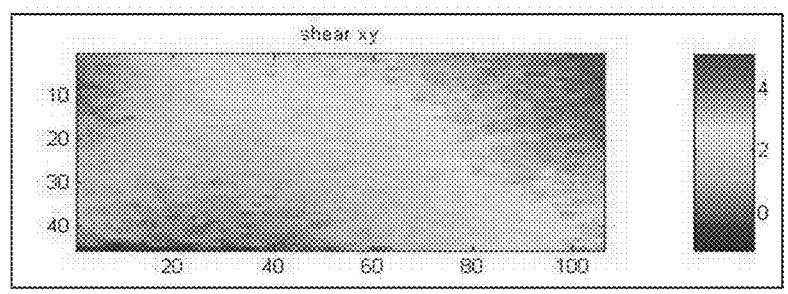
FIG. 54 illustrates shear stresses in the xy plane.

The shear stresses in the xy plane are calculated from the polariscope measurement using Equation 23, as shown in FIG. 54. The shear stresses in the xy plane are small since all the shear stress comes from the residual stress, which is assumed negligible in the CZ wafer.

Figure 55:
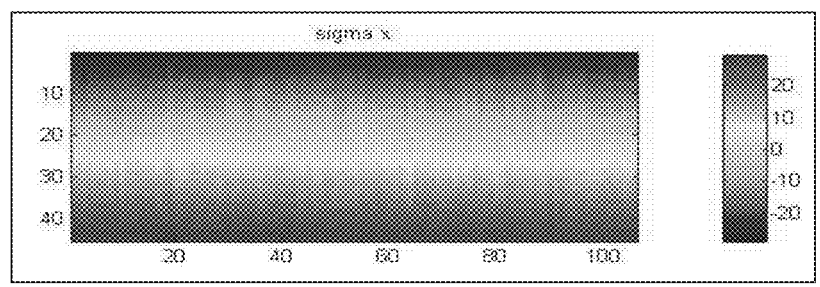
FIG. 55 illustrates normal stresses $\sigma_x$ in xy plane.
Figure 56:
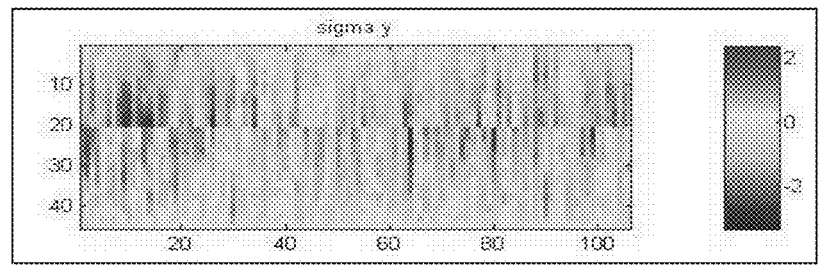
FIG. 56 illustrates normal stresses $\sigma_y$ in xy plane.

Finally, normal stresses in the xy plane are calculated using Equations 18 and 19, which are shown in FIGS. 55 and 56, respectively. The normal stress in the x direction is uniform along the longitudinal direction, and is tensile at the bottom, and compressive at the top. The observed maximum stress is approximately 32 MPa. The stress in the y direction is small since the only normal stresses in the y direction come from the residual stress (the sample is loaded in pure bending). All of this shows that derived stress state is in good agreement with the applied stress.

Figure 57:
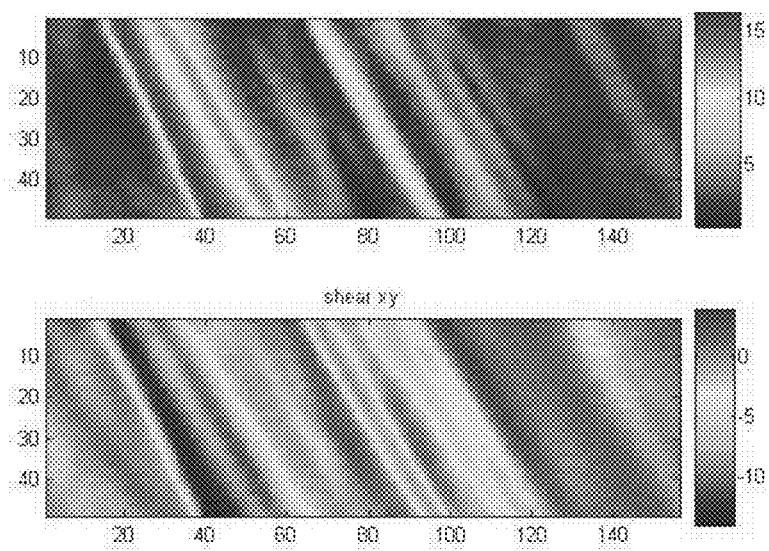
FIG. 57 illustrates residual shear stresses and shear stresses in xy plane.

The same methodology was applied to an EFG beam. The difference is that the EFG beam exhibited higher values of stress than the CZ beam, which is shown in FIG. 57.

Figure 58:
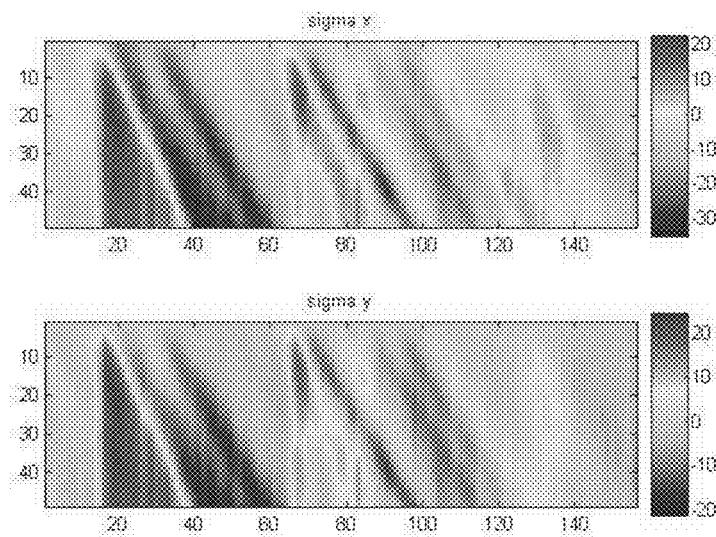
FIG. 58 illustrates residual normal stresses in the xy plane.

FIG. 58 shows the residual normal stresses in the xy plane obtained by the shear difference method. The observed maximum tensile stress is approximately 20 MPa for this particular sample.

Figure 59:
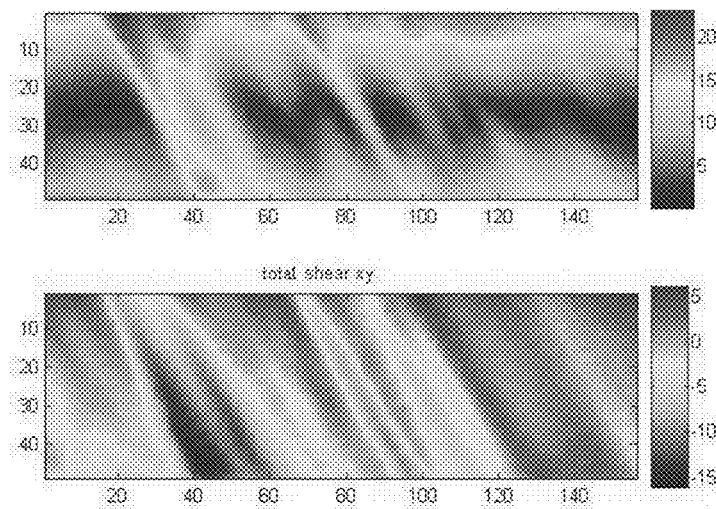
FIG. 59 illustrates the total shear stresses and corresponding shear stresses in xy plane.

Four point bending stresses are applied to the beam and total maximum shear stresses including residual and applied stresses were measured using the inventive polariscope as shown in FIG. 59.

Figure 60:
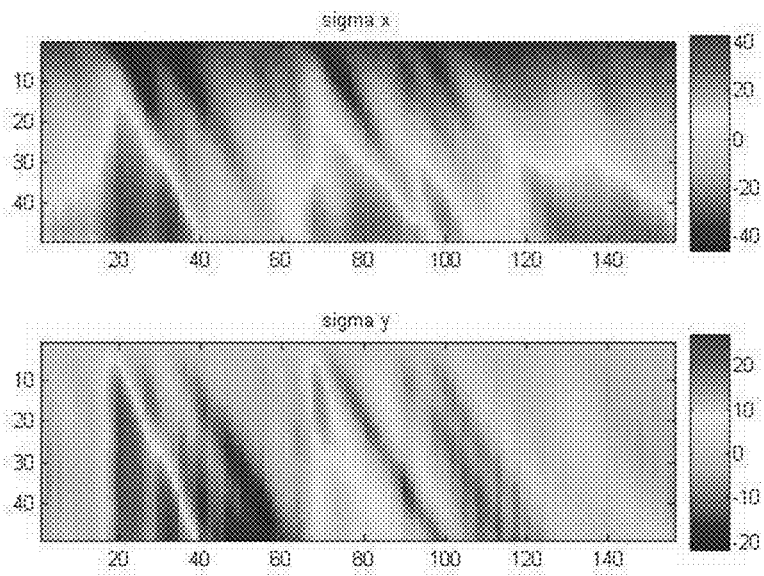
FIG. 60 illustrates the total normal stresses in xy plane.

FIG. 60 shows the total normal stresses, including residual and applied stresses, in the xy plane obtained by the shear difference method. The observed maximum normal stress is approximately 40 MPa.

Figure 61:
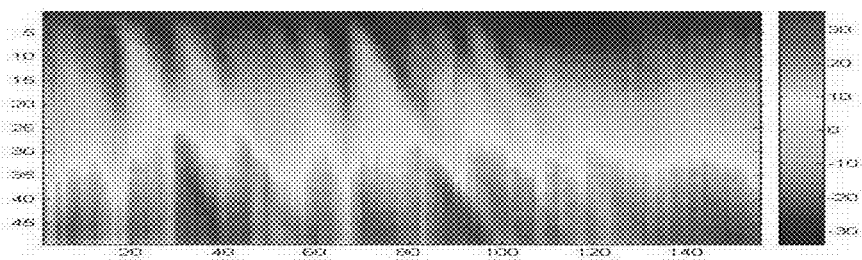
FIG. 61 illustrates four point bending stresses calculated by the shear difference method.

Finally, pure bending stress in the x direction can be calculated by subtracting the residual normal stress from the total stress, as shown in FIG. 61, which is in good agreement with the predicted stress due to the applied load.

Figure 62:
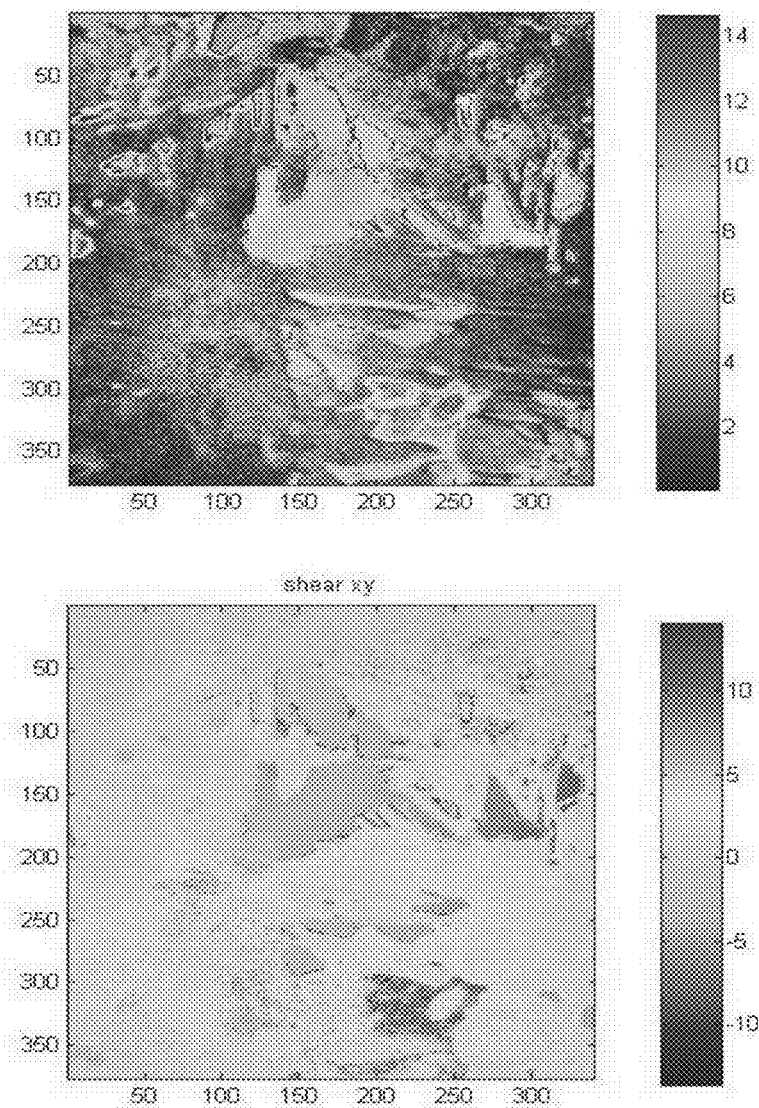
FIG. 62 illustrates the maximum shear stresses and shear stresses for a 156 mm×156 mm cast silicon wafer.

The same procedure was performed for 156 mm×156 mm cast wafers. Residual stresses of the entire wafer were measured by the inventive polariscope system described above. FIG. 62 shows residual shear stresses and shear stresses in xy plane.

Figure 63:
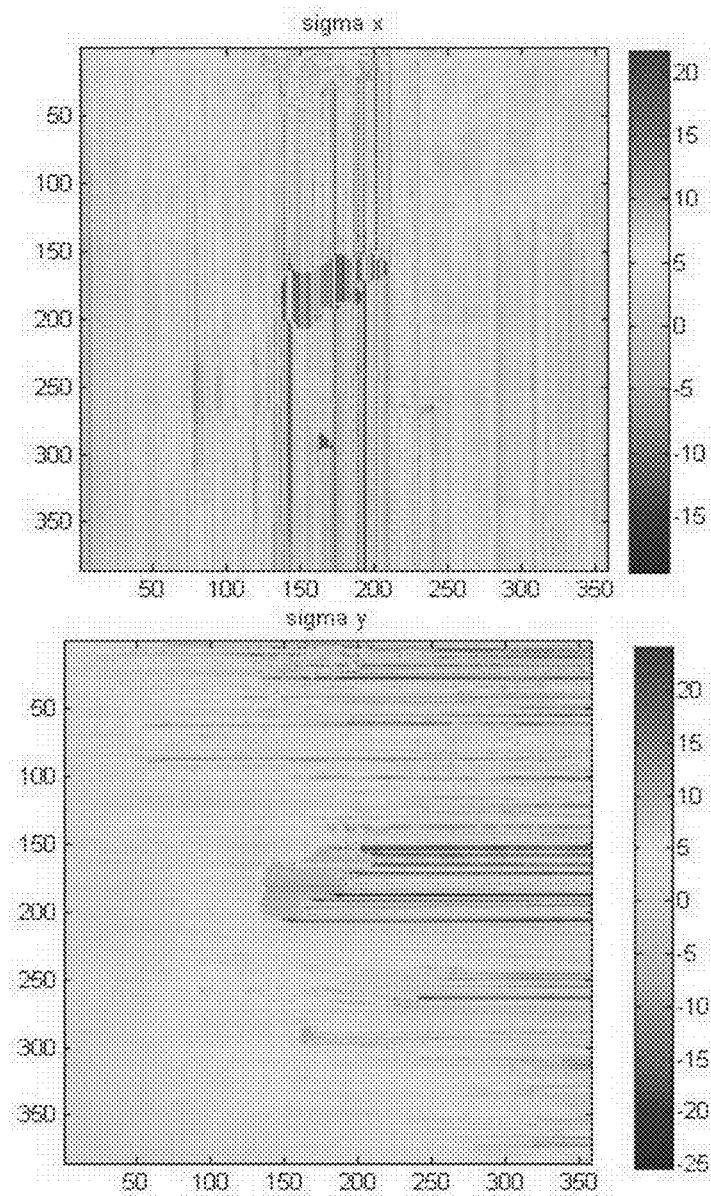
FIG. 63 illustrates normal stresses in x and y direction.

Normal stresses in the x and y directions are calculated using Equations 18 and 19, respectively. The maximum observed tensile stress is approximately 27 MPa as shown in FIG. 63. Due to the integration method employed, errors may be accumulated along the integration path from the edge boundary. The error is less than 1 MPa within 10 mm of the integration path.

When measuring stresses in cast wafers using a polariscope, it typically takes a few seconds to obtain thermal steady state in the wafer due to the thermal load of the light source. The six phase stepping method and the ten step method are used to obtain the photoelastic parameters by rotating the waveplates and polarizer/analyzer as described in Table 1 and Table 2. The measurement typically takes about 15 seconds per step, and the six or ten images are not taken at the same time. If the wafer is not under thermal steady state, the six or ten images may not be taken under the same stress state due to the variation in thermal stresses over time. Based on the measurement results of the cast wafers, measuring stresses in a state of thermal transition increases the measurement error dramatically. Therefore, it is important to know how long it takes the system to reach thermal steady state.

Figure 64:
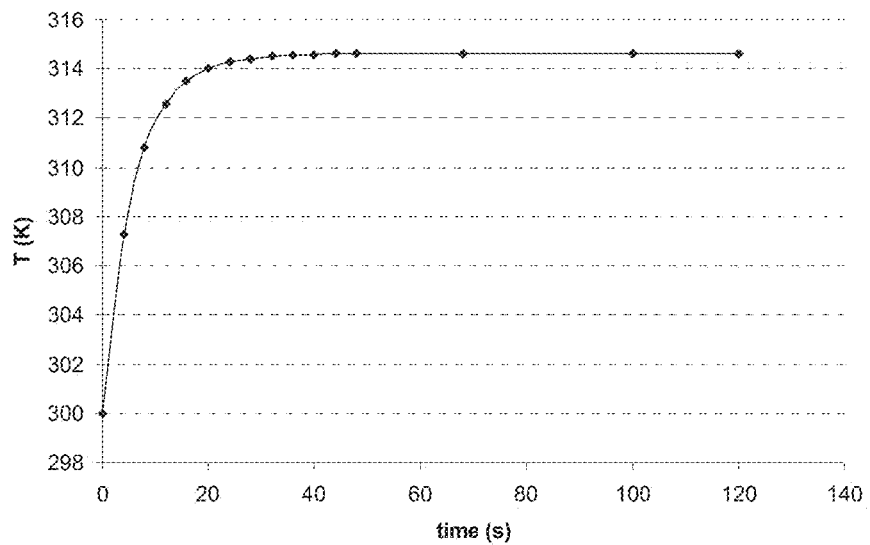
FIG. 64 illustrates temperature as a function of time for a node at the center of a silicon wafer.

A thermal transient model of the system was developed using ANSYS. The light source was simulated as a heat flux on the wafer surface. Although the power of the light source is 200 watts, the energy of the light impinging the wafer surface is approximately 10 watts due to the use of a small aperture positioned in front of the light source. The ANSYS model calculated the temperature of the wafer as a function of location on the wafer and as a function of time of illumination. The temperature of a single node from the model, which is located at the center of the wafer, was extracted and plotted with time, as shown in FIG. 64. It can be seen from FIG. 64 that it takes about 20 to 30 seconds for the wafer to reach thermal steady state. The predicted result is in close agreement with experimental observations of the measurements of cast wafers.

Figure 65:
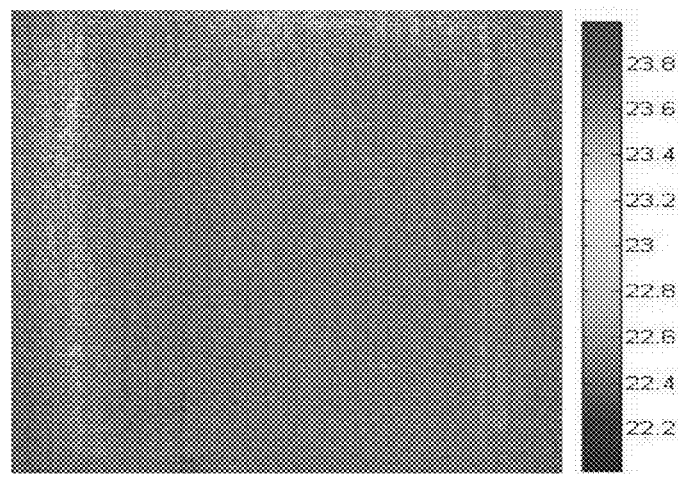
FIG. 65 illustrates the temperature profile of a 156 mm×156 mm wafer measured by a thermal camera.
Figure 66:
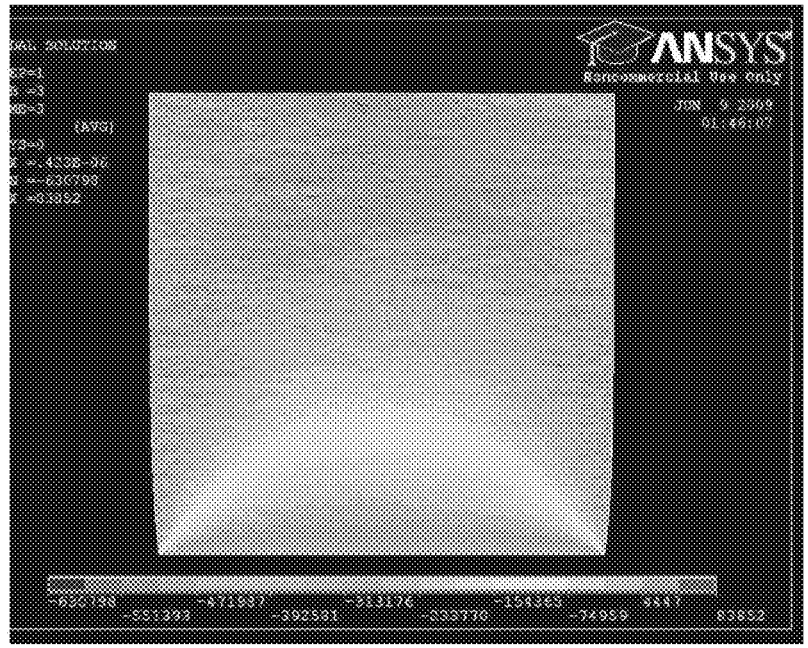
FIG. 66 illustrates the thermal normal stresses in x direction.
Figure 67:
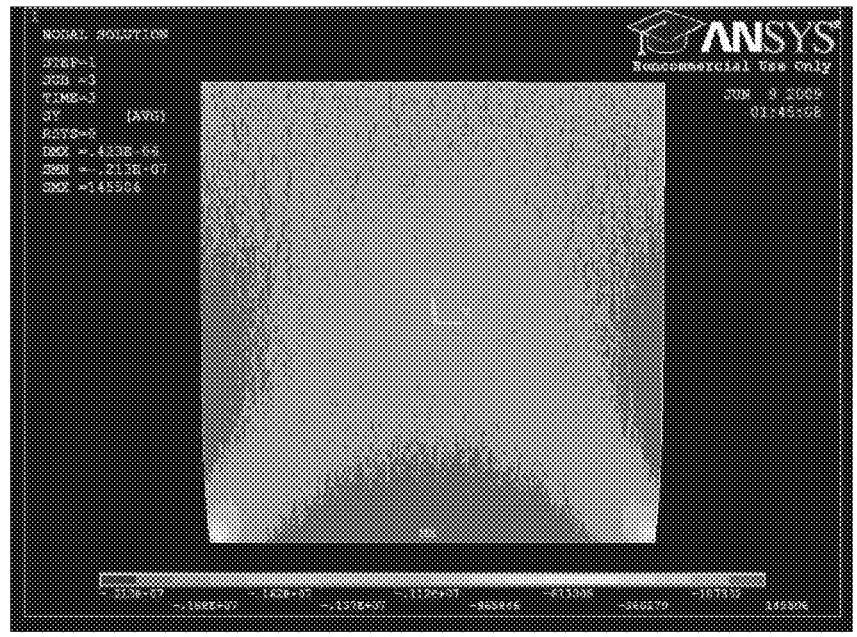
FIG. 67 illustrates the thermal normal stresses in y direction.
Figure 68:
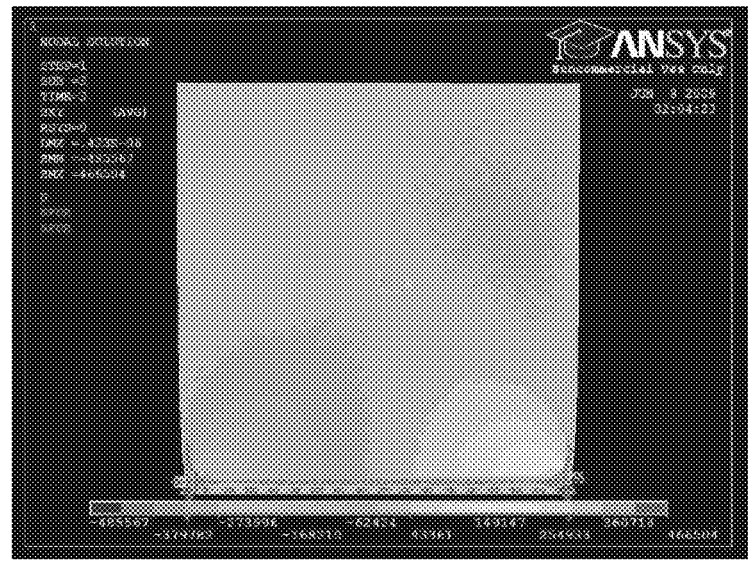
FIG. 68 illustrates the thermal shear stresses in xy plane.

A structural ANSYS model was created to calculate the thermal stress at the final steady state. The temperature profile of the wafer is measured by a thermal camera as shown in FIG. 65. The highest temperature is about 24° C. and the lowest temperature is about 22° C. The temperature difference is small because silicon is a good thermal conductor. The free stress state is assumed to be 20° C., which is room temperature. The temperature profile was imported into the structural model as the thermal load. The calculated thermal normal stresses in the x, y directions and shear stresses in xy plane are shown in FIGS. 66, 67, and 68, respectively. The maximum stress is below 1 MPa. Compared to the residual stress magnitude of the wafers, the thermal stresses are negligible.

A traditional polariscope is usually used for a specimen with a thickness of the order of millimeters and a stress level of 100 MPa, where multiple fringes can be observed and phase unwrapping is required to remove the discontinuity in the phase difference. The error, which is of the order of a fractional fringe, is negligible compared with multiple fringes. However, for a photovoltaic silicon wafer with a thickness less than 300 µm and a stress level around 10 MPa, only a partial fringe can be observed, and the error analysis is therefore crucial to determining the system reliability.

The maximum errors associated with wavelength mismatch of the quarter waveplates are of the order of 0.012 fringe order. Wavelength mismatch is not of concern with the inventive system due to the relatively narrow bandwidth (10 nm) of the monochromatic light obtained using the band pass filter. Error due to angular misalignment in the waveplates and polarizers are minimized or prevented by ensuring proper system alignment and calibration of the infrared camera.

The sources of error considered here is the misalignment of the light source, two waveplates, the polarizers, the lenses, and the camera. The maximum error in stress is approximately 1.4 MPa, which is fairly large compared to the residual stresses in the wafers and it is thus important to align the system carefully. Use of a standard alignment procedure beneficially prevents introduction of such errors.

Figure 69:
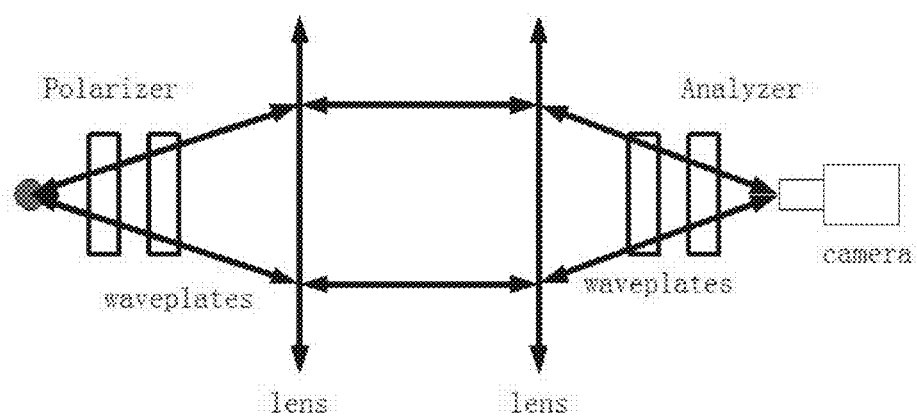
FIG. 69 illustrates the light path through the circular polariscope of FIG. 35.

As discussed above, the inventive circular polariscope preferably uses a tungsten light source, which has visible light. Thus the alignment of the polariscope can be validated by checking the light path visually. FIG. 69 shows the schematic of light path of the polariscope system. The double sided arrows indicate that the light transmitted and reflected follows the same path after the system is aligned properly.

An opaque plate with a circular hole of 5 mm in diameter is at the focus of the light source and can convert the light source to a point source. An opaque paper can be used to check if the light source is focused at the hole. If a focused image of the filament is seen on the paper, then the light source is converted to a point source at the hole.

Figure 70:
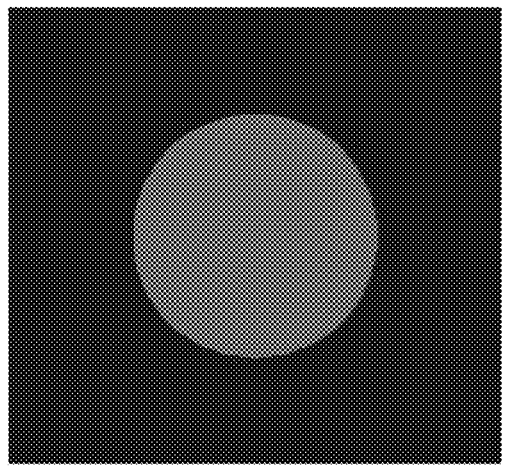
FIG. 70 illustrates a collimated light spot between the two lenses of the polariscope of FIG. 35.

The next step is to align the two big lenses. The point source is placed at the focus of the first lens, which results in a collimated beam behind the first lens. If an opaque paper is placed behind the lens, a circular light spot can be seen as shown in FIG. 70. The size of the collimated beam should remain constant regardless of the paper location; if properly aligned, the size of the light beam will be the same if the paper is moved further from or closer to the lens.

The second lens is identical to the first one, so the first lens can be taken as the reference of the second lens. The alignment of the second lens can be examined by checking whether or not the point source is at the center of the reflected light.

Figure 71:
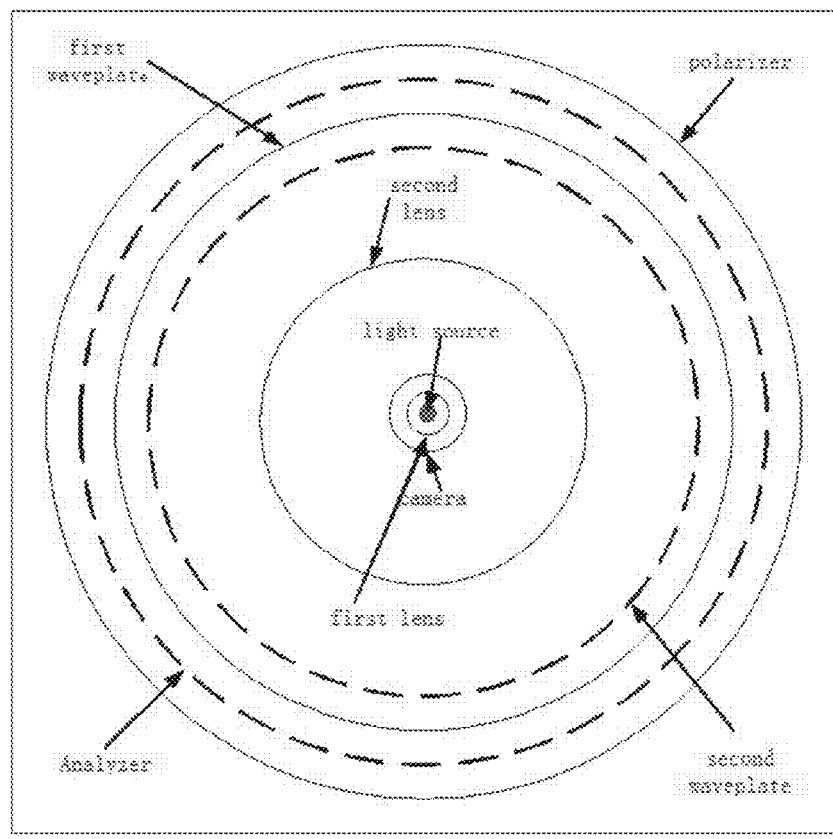
FIG. 71 illustrates the reflected light pattern of the different optics of the properly aligned polariscope of FIG. 35.

After properly positioned the two big lenses, the preferred sequence of aligning all the other optics is from the end to the beginning of the light path. In this way, the reflected light of any optic will not be blocked by the one in front of it. To ensure that the optics are properly aligned, the reflected light and the light source should be concentric. FIG. 71 shows the reflected light pattern of the properly aligned system. The dashed lines indicate that they cannot be seen in the final setup.

After the system is properly aligned, the light transmission image is captured by the infrared camera. Without any sample in the system, the image captured by the camera is a diffraction pattern of the circular hole, which is called an airy disk as shown in FIG. 72. Both FIGS. 71 and 72 should be checked to ensure the system is properly aligned.

As discussed above, the stress optic law is a linear function, and a six phase stepping method is used to extract the two photoelastic parameters, isoclinic angle and phase retardation. Equations 14 and 15 show that the two parameters are related to the light intensity of the six images. FIGS. 73 and 74 show a comparison of the first and second images, respectively, which shows that the intensity of the six images is quite different. Thus, the camera response to light power should be linear. Otherwise, the gray level of the six images will represent inaccurate information of the light intensity.

Figure 75:
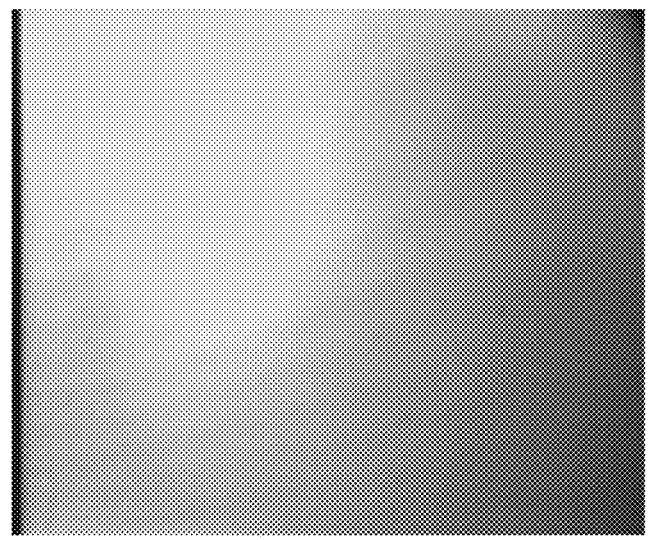
FIG. 75 illustrates a light intensity image of a CZ silicon wafer taken by the polariscope of FIG. 35.
Figure 76:
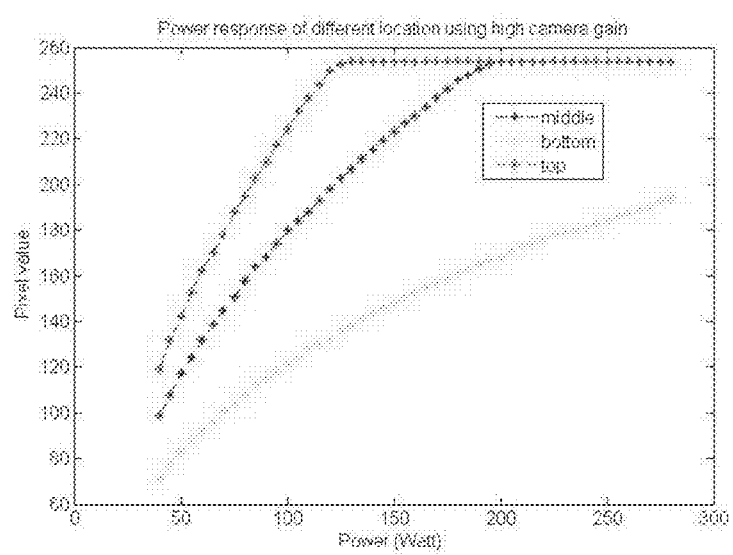
FIG. 76 illustrates camera responses using a high camera gain with the polariscope of FIG. 35.

An image of a CZ wafer captured by the camera is shown in FIG. 75. The image is neither uniform nor symmetric due to the different response of the pixels in the infrared CCD camera. Experiments were designed to study the camera response to the light source power. The light source power was increased by five increments over the range from 40 to 280 watts. The response to the light power using the highest camera gain is shown in FIG. 76, and the three lines come from the top left, middle, and bottom right of the image, respectively. The results show that the power response is non-linear. In order to fully interpret the entire response, median and low camera gains were also used, and the response results are shown in FIGS. 77 and 78, respectively.

Figure 77:
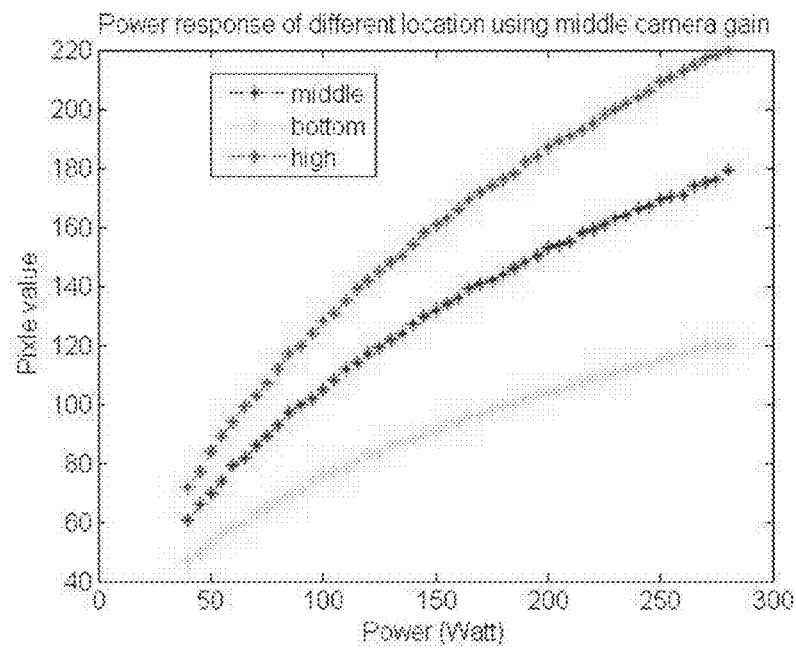
FIG. 77 illustrates camera responses using a medium camera gain with the polariscope of FIG. 35.
Figure 78:
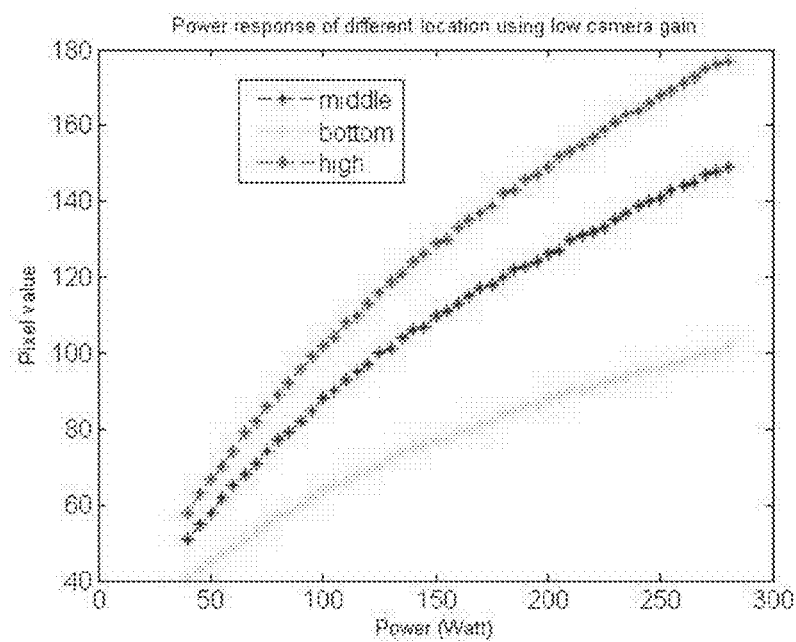
FIG. 78 illustrates camera responses using a low camera gain with the polariscope of FIG. 35.

By combining the three images from FIGS. 75-77, a linear response of the camera can be found using a piecewise function. The program first searches the pixel value of a certain location using the low camera gain in order to avoid saturation. If the pixel value falls into the range of the low camera gain, then a piecewise linear response of all six images is simulated using low camera gain. Otherwise, the program keeps searching using the median and high camera gains until the program finds the range containing the pixel value. Finally, the linear relations are used to adjust all six images simultaneously. FIGS. 79 and 80 show images before and after adjusting the camera response, respectively. The image of FIG. 80, after adjusting the camera response, has higher contrast and the difference between grain transmissions is enlarged.

The maximum shear stresses are calculated from the adjusted six images. After calibrating the camera, systematic error is reduced dramatically. FIGS. 81 and 82 illustrate the maximum shear stresses before and after adjusting the camera response, respectively. Grains can be seen much more distinctly after linearly adjusting the camera.

To further reduce the system error, a stress free CZ wafer was measured by the polariscope, and the phase map is shown in FIG. 83. Since the wafer is stress free, the phase retardation comes from the system error. For EFG wafers, which have high stress, it is not critical to eliminate the system error. But for the cast and single crystal wafers, which contain low stress, it is important to subtract the system error.

FIGS. 84 and 85 are phase maps of a CZ single crystal and cast wafer, respectively. They contain the pattern of the stress free map. In order to obtain the pure residual stress state of the wafers, the system error must be subtracted from the phase map. Results after such subtraction are shown in FIGS. 86 and 87, respectively.

After subtracting the system error, the stress pattern is removed from the stress map. For the cast wafers, the stress difference between grains is much more evident. After adjusting the camera and subtracting the system error, the accuracy of the polariscope system is increased to about 1 MPa.

In summary, the stress-optic coefficients for different grain orientations and stress orientations are calibrated using four point bending experiments. The variation of the maximum stress optic coefficients to the minimum is about 1.7. Grain orientations are characterized by light intensity of the images captured by an infrared camera instead of x-ray diffraction. Among (100), (110), and (111) orientations, (111) orientations were found to have the highest light transmission and (100) orientations the lowest light transmission. The inventive polariscope system is capable of in situ stress measurement of wafers as large as 156 mm×156 mm. The location-dependent stress optic coefficients are calibrated for the entire illuminating field of the system and applied to the residual stress measurement of multi crystalline silicon wafers. A new formula was introduced to extend the range of the principal stress orientation from $(-\pi/4, \pi/4)$ to $(-\pi/2, \pi/2)$, and retardation from $(0,\pi)$ to $(0,2\pi)$. The ambiguity at the boundaries is eliminated completely. By applying the shear difference method, full stress components are obtained for the entire wafer. Error is reduced to 1 MPa by linearly calibrating the camera and subtracting the system pattern from the residual stress measurement. The system is aligned based on the light transmission path.

While the preferred embodiments of the present invention have been described above, it should be understood that they have been presented by way of example only, and not of limitation. It will be apparent to persons skilled in the relevant art that various changes in form and detail can be made therein without departing from the spirit and scope of the invention. Thus the present invention should not be limited by the above-described exemplary embodiments, but should be defined only in accordance with the following claims and their equivalents. Furthermore, while certain advantages of the invention have been described herein, it is to be understood that not necessarily all such advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other advantages as may be taught or suggested herein.

APPENDIX A

Pseudo Codes

```
1.   6 Phase Stepping
for i=1:6
     convert i.bmp to intensity matrix
end
[dimX, dimY] = size(1.bmp)
for i=1:dimX
     for j=1:dimY
          isoclinic angle(i,j) = IntensityToTheta(3(i,j), 4(i,j), 5(i,j), 6(i,j))
          phase retardation(i,j) = IntensityToAlpha(1(i,j), 2(i,j), 3(i,j),
          4(i,j), 5(i,j), 6(i,j))
     end
end
for i=1:dimX
     for j=1:dimY
          Tau_max(i,j) = MaximumShearStress(isoclinic angle(i,j), phase
          retardation(i,j))
     end
end
figure(1) = plot(Tau_max)
figure(2) = plot(isoclinic angle)
save MaximumShearStress
save isoclinic angle
2.   10 Phase Stepping
for i=1:10
     convert i.bmp to intensity matrix
end
[dimX, dimY] = size(1.bmp)
for i=1:dimX
     for j=1:dimY
          isoclinic angle(i,j) = IntensityToTheta(1(i,j), 2(i,j), 3(i,j), 4(i,j))
          phase retardation(i,j) = IntensityToAlpha(5(i,j), 6(i,j), 7(i,j),
          8(i,j), 9(i,j), 10(i,j))
     end
end
for i=1:dimX
     for j=1:dimY
          Tau_max(i,j) = MaximumShearStress(isoclinic angle(i,j), phase
          retardation(i,j))
     end
end
figure(1) = plot(Tau_max)
figure(2) = plot(isoclinic angle)
save MaximumShearStress
save isoclinic angle
```

What is claimed is:

1. A polariscope for measuring a sample, comprising:
a light source;
a sample stage for retaining the sample to be measured;
a camera;
a first polarizer;
a second polarizer;
a first waveplate; and
a second waveplate; wherein:
said light source and said camera are positioned such that light emitting from said light source defines a light path that passes from said light source and into said camera;

said sample stage is positioned such that when the sample is positioned thereon the sample is within said light path;

each of said first polarizer, said second polarizer, said first waveplate, and said second waveplate are positioned within said light path intermediate said light source and said camera;

said first and second polarizers are near infrared linear polarizers having a diameter of about 80 to 120 mm; and said first and second waveplates are first-order quarter waveplates with a wavelength of about 1130 to 1170 nm and a diameter of about 80 to 120 mm.

2. The polariscope of claim 1, wherein:
said first polarizer is positioned intermediate said light source and said first waveplate; and
said second polarizer is positioned intermediate said camera and said second waveplate.

3. The polariscope of claim 1, wherein said light source comprises a tungsten-halogen lamp or an infrared laser.

4. A method of determining the amount of residual stress present in a sample, comprising:
providing a polariscope including a light source and a camera positioned such that light emitting from said light source defines a light path that passes from said light source into said camera;
placing the sample within said light path;
causing light to emit from said light source through the sample and into said camera;
capturing an image of said light after passing through the sample;
determining a maximum shear stress within the sample based on said image; and
determining full residual stress components within the sample based on said maximum shear stress.

5. The method of claim 4, wherein:
said providing includes providing a polariscope also including a first polarizer positioned intermediate said light source and the sample, a first waveplate positioned intermediate said polarizer and the sample, a second polarizer positioned intermediate said camera and the sample, and a second waveplate positioned intermediate said second polarizer and the sample; and
said capturing includes capturing multiple images of said light passing through the sample, each image taken with said second waveplate and said second polarizer at collectively unique angular orientations.

6. The method of claim 5, wherein said capturing includes capturing an image of said light after passing through the sample for each of the following second waveplate and second polarizer orientations:

| I | φ | β |
|---|---|---|
| 1 | 0 | π/4 |
| 2 | 0 | −π/4 |
| 3 | 0 | 0 |
| 4 | π/4 | π/4 |
| 5 | π/2 | π/2 |
| 6 | 3π/4 | 3π/4 | where I is the image number, φ is the approximate angular orientation of said second waveplate, and β is the approximate angular orientation of said second polarizer.

7. The method of claim 5, wherein said capturing includes capturing an image of said light after passing through the sample for each of the following second waveplate and second polarizer orientations:

| I | φ | β |
|---|---|---|
| 1 | π/2 | 0 |
| 2 | 5π/8 | π/8 |
| 3 | 3π/4 | π/4 |
| 4 | 7π/8 | 3π/8 |
| 5 | π/2 | π/2 |
| 6 | π/2 | 0 |
| 7 | π/2 | 0 |
| 8 | π/2 | π/4 |
| 9 | π/2 | 0 |
| 10 | π/2 | π/4 | where I is the image number, φ is the approximate angular orientation of said second waveplate, and β is the approximate angular orientation of said second polarizer.

8. The method of claim 5, wherein said determining full residual stress components includes resolving system ambiguity of a principal stress orientation.

9. The method of claim 8, wherein said resolving comprises calculating a principal stress orientation θ and a phase retardation δ using the following formulae:

$$\theta = \tfrac{1}{2} \operatorname{atan} 2(I_5 - I_3, I_4 - I_6), \text{ and}$$

$$\delta = \operatorname{atan} 2[(I_5 - I_3)\sin 2\theta + (I_4 - I_6)\cos 2\theta, I_1 - I_2],$$

where $I_1$ is a first of said multiple images, $I_2$ is a second of said multiple images, $I_3$ is a third of said multiple images, $I_4$ is a fourth of said multiple images, $I_5$ is a fifth of said multiple images, and $I_6$ is a sixth of said multiple images.

10. The method of claim 8, wherein said resolving comprises calculating a principal stress orientation θ and a phase retardation δ using the following formulae:

$$\theta = \frac{1}{4}\tan^{-1}\left(\frac{I_4 - I_2}{I_3 - I_1}\right), \text{ and}$$

$$\delta = \tan^{-1}\left(\frac{(I_9 - I_7)\sin 2\theta + (I_8 - I_{10})\cos 2\theta}{I_5 - I_6}\right),$$

where $I_1$ is a first of said multiple images, $I_2$ is a second of said multiple images, $I_3$ is a third of said multiple images, $I_4$ is a fourth of said multiple images, $I_5$ is a fifth of said multiple images, $I_6$ is a sixth of said multiple images, $I_7$ is a seventh of said multiple images, $I_8$ is a eighth of said multiple images, $I_9$ is a ninth of said multiple images, and $I_{10}$ is a tenth of said multiple images.

11. The method of claim 5, wherein said determining full residual stress components comprises:
determining stress conditions at an edge of the sample; and
determining stress conditions at internal portions of the sample by integrating inward from said edge.

12. The method of claim 11, wherein said determining stress conditions at said edge of the sample comprises:
calculating a shear stress in a plane of the sample; and
calculating normal stresses based on said calculated shear stress.

13. The method of claim 12; wherein said calculating a shear stress includes using the following formula:

$$\tau_{xy} = \frac{1}{2}|\sigma_1 - \sigma_2|\sin 2\theta = \tau_{max}\sin 2\theta = \frac{\lambda}{4\pi C(\varphi, \theta)}\delta\sin 2\theta,$$

where $\tau_{xy}$ is the calculated shear stress in an xy plane of the sample, $\sigma_1$ and $\sigma_2$ are two principal stresses, θ is a principal stress orientation, $\tau_{max}$ is a maximum shear stress as measured by said polariscope, $\lambda$ is a wavelength of said light, $C(\phi,\theta)$ is an anisotropic stress-optic coefficient as a function of principal stress orientation and crystal grain orientation, and $\delta$ is a phase retardation.

14. The method of claim 13, wherein said calculating normal stresses includes using the following formulae:

$$(\sigma_y)_j = (\sigma_y)_i - \int_i^j \frac{\partial \tau_{xy}}{\partial x} dy, \text{ and}$$

$$(\sigma_x)_j = (\sigma_x)_i - \int_i^j \frac{\partial \tau_{yx}}{\partial y} dx,$$

where $\sigma_y$ is a normal stress in a y direction, $\sigma_x$ is a normal stress in an x direction, i is a first location along said edge, j is a final location along said edge, and both $\tau_{xy}$ and $\tau_{yx}$ are the calculated shear stress in said xy plane of the sample.

15. The method of claim 4, wherein the method is non-destructive of the sample.

16. The method of claim 4, wherein said providing a polariscope includes providing a polariscope configured to measure a sample having dimensions of at least 156 mm by 156 mm.

* * * * *